(12) United States Patent
Paterson et al.

(10) Patent No.: US 12,434,366 B2
(45) Date of Patent: Oct. 7, 2025

(54) TRIGGER VALVES FOR PRESSURIZED FLUID OPERATED DEVICES

(71) Applicant: Globalforce IP Limited, Ponsonby (NZ)

(72) Inventors: Ian Craig Paterson, Auckland (NZ); William Michael Duff, Lynmouth (NZ)

(73) Assignee: Globalforce IP Limited, Ponsonby (NZ)

( * ) Notice: Subject to any disclaimer, the term of this patent is extended or adjusted under 35 U.S.C. 154(b) by 251 days.

(21) Appl. No.: 17/797,389

(22) PCT Filed: Dec. 11, 2020

(86) PCT No.: PCT/NZ2020/050173
§ 371 (c)(1),
(2) Date: Aug. 3, 2022

(87) PCT Pub. No.: WO2021/158126
PCT Pub. Date: Aug. 12, 2021

(65) Prior Publication Data
US 2023/0065490 A1    Mar. 2, 2023

Related U.S. Application Data

(60) Provisional application No. 62/986,563, filed on Mar. 6, 2020.

(30) Foreign Application Priority Data
Feb. 3, 2020    (NZ) .......................................... 761370

(51) Int. Cl.
*B25C 1/04*    (2006.01)
*B25D 9/08*    (2006.01)
(Continued)

(52) U.S. Cl.
CPC ................ *B25C 1/043* (2013.01); *B25D 9/20* (2013.01); *F15B 13/027* (2013.01); *F15B 15/20* (2013.01);
(Continued)

(58) Field of Classification Search
CPC ........... B25C 1/043; B25C 1/047; B25D 9/20; B25D 9/08; B25D 2250/181; F16K 31/163; F41B 11/72
See application file for complete search history.

(56) References Cited

U.S. PATENT DOCUMENTS 3,494,530 A    2/1970    Bade
4,480,528 A    11/1984   Shiroyama
(Continued)

FOREIGN PATENT DOCUMENTS

AU    2013201948 A1    4/2013
JP    2002137173 A     5/2002

OTHER PUBLICATIONS

Written Opinion, issued in International Application No. PCT/NZ2020/050173 by the International Bureau on Mar. 19, 2021.
(Continued)

*Primary Examiner* — Veronica Martin
(74) *Attorney, Agent, or Firm* — Lowe Graham Jones PLLC; Ellen M. Bierman

(57) ABSTRACT

An actuation trigger for a device, comprising or including, A dose chamber to hold a charge of high pressure working fluid, received from a high pressure source, A dose valve, biased closed to seal the dose chamber off from a working chamber, and hold the charge in the dose chamber, A hammer operated by a piston with a driven chamber on a first side of the piston, and a trigger chamber on a second side of the piston, sealed from the first side, the driven chamber receiving high pressure working fluid directly or (Continued)

indirectly from the high pressure source, A trigger valve to selectively supply high pressure working fluid to the trigger chamber, or to release high pressure working fluid from the trigger chamber, Such that when the hammer has high pressure working fluid in both the driven chamber and the trigger chamber it is held by a force imbalance in a first position, and when the high pressure working fluid is released from the trigger chamber, the hammer is driven to, or towards a second position towards the trigger chamber, The hammer, when driven to, or towards the second position strikes the dose valve, unseating the dose valve to unseal the dose chamber and the working chamber thus allowing the charge to enter the working chamber to do work therein.

19 Claims, 12 Drawing Sheets

(51) Int. Cl.
*B25D 9/20* (2006.01)
*F15B 13/02* (2006.01)
*F15B 15/20* (2006.01)
*F16K 31/163* (2006.01)
*F41B 11/72* (2013.01)

(52) U.S. Cl.
CPC ............ *F16K 31/163* (2013.01); *B25C 1/047* (2013.01); *B25D 9/08* (2013.01); *B25D 2250/181* (2013.01); *F41B 11/72* (2013.01)

(56) References Cited

U.S. PATENT DOCUMENTS

2007/0119899 A1* 5/2007 Ronconi ................ B25C 1/042
  227/130
2011/0315737 A1* 12/2011 Hamilton ................ B25F 5/008
  173/171

OTHER PUBLICATIONS

International Search Report, issued in International Application No. PCT/NZ2020/050173 by the International Bureau on Aug. 12, 2021.

* cited by examiner

TRIGGER VALVES FOR PRESSURIZED FLUID OPERATED DEVICES

CROSS-REFERENCE TO RELATED APPLICATIONS

This application is 371 U.S. National Phase Application of PCT/NZ2020/050173, entitled "IMPROVEMENTS IN, OR RELATING TO, TRIGGER VALVES FOR PRESSURISED FLUID OPERATED DEVICES, filed Dec. 11, 2020, which claims priority to New Zealand Application No. 2020761370 entitled "IMPROVEMENTS IN, OR RELATING TO, TRIGGER VALVES FOR PRESSURISED FLUID OPERATED DEVICES," filed Feb. 3, 2020, and which claims the benefit of U.S. Provisional Application No. 62/986,563, which applications are incorporated herein by reference in their entireties.

TECHNICAL FIELD OF THE INVENTION

The present invention relates to triggering and valving for pressurised fluid powered devices.

In particular, though not solely, the present invention is directed to apparatus and methods for triggering and valving for pressurised fluid powered devices, whether high or low pressure and exhausting the device.

BACKGROUND OF THE INVENTION

There are pressure systems that use a fluid, for example air or another gas, or a liquid, whether high or low pressure, to drive a work load. The work load may be a reciprocating piston, an ejected projectile or the pressure acts on an item with a pressure pulse. In such applications there is the need to introduce the pressurised fluid into a region that can do the work on the workload, for example a working chamber. One such method to introduce the pressurised fluid to the workload is through a valve, that directly or indirectly isolates the workload from a reservoir and the pressurised fluid source. The valve opens under action of an event, for example triggering by an external signal. Transfers the amount of high pressure working fluid to the workload, and then closes again, the high pressure working fluid then does work. For example the high pressure working fluid may then expand to drive the work load down the work chamber.

Prior art pneumatic trigger systems are not suitable for creation of extremely short momentary pressure pulses, they are typically of valving systems which operate in a toggled on/off manner. The time frame from on to off is normally relatively lengthy, and this can be inefficient from the point of view of use of the working fluid. The inefficiency comes from the large volume of working fluid that is used due to the slow opening/closing, especially when high pressures are considered. Further the working fluid that is then introduced is not allowed to expand in such a way that it produces work efficiently—typically it doesn't expand by a high multiple, it just fills the working cycling and pushes it. This also means the cycle rate of such prior art systems is relatively low.

Prior art systems that do achieve a high cycle rate are abnormally complex and can suffer early wear or inconsistent cycle times.

Trigger systems to date, have further shortcomings. For example traditional pneumatic triggers, for example in a nail gun or similar, are typically designed to be exclusively integrated into systems which are 'tethered' meaning they do not have an 'onboard' pressure supply—they do not need to use the working fluid efficiently, as there is a relatively cheap inexhaustible supply—for example from the compressor the tool is tethered to.

Regulations and general safety design require means to make portable pneumatic/mechanical systems safe and inert when not in use, during shipping, for repair. Prior art systems to date have a separate valve system to achieve this which introduces complexity, part count and cost. Also when considering applications that require high performance in lightweight, portability, ergonomics, functional simplicity, and/or low manufacturing cost, incorporating additional parts and mechanisms to achieve a "make-safe" function is antithetical to those performance goals/metrics/philosophies.

Also such tethered systems need to be able to be disconnected from the separate air supply, so pressure must be able to be vented from these systems before disconnection of their pressure supply to enable safe disconnection, thereby making the system inert. These systems would generally 'back purge' any charged chambers through the pressure supply tubing or pipework. Such a system is not compatible with highly thermodynamically efficient designs that allow for un-tethered use. These purging valves must be integrated into the system itself.

Traditional trigger spool valve systems place the critical "switching" o-ring on the spool core, which is necessarily smaller in diameter than the spool bore within which the spool core slides. This switching o-ring placement becomes unsuitable for high pressure applications as the sealing/sliding diameter is defined by the smallest viable core diameter and the thickness of the seal. This means the switching o-ring is too thin to switch high pressure operating fluids over long cycles. This is because the available area for the switching o-ring is small, that of the spool bore. This results in small areas, and thin switching o-rings and therefore a weak switching o-ring.

In high pressure applications opening the valve is complex. The forces acting can be very large, and the time frames to open such valving are very small. This must all be done in a controlled repeatable manner to provide a reliable and efficient system that does the most work from the lowest volume of high pressure working fluid.

There is therefore a need to have a reliable, robust, repeatable trigger system for these systems.

Necessary also is the ability to exhaust pressure from behind the workload as it moves, or is moved into position for doing work, or firing.

For example, but not limited to, when the working chamber is a closed volume and the workload is a reciprocating piston within that chamber. Even in very efficient systems, when nearly all the pressure in the working fluid is utilised as work on the workload, for example sending the piston down to a far end of the work chamber, there may still be residual pressure behind the work load. This residual pressure will prevent or slow the return of the workload, for example the piston, back down the chamber to begin the next cycle of work.

In another example all the pressure from working fluid may be utilised, but pressure builds up as the workload returns. This may happen in a closed volume working chamber with a piston, or when open ended and for example a projectile is front loaded into the chamber and pushed down into the chamber. In the example where the working chamber may be open ended, it needs to vent pressure behind the workload, for example a projectile, as it is inserted down into the working chamber prior to being acted on by the pressurised fluid.

The need to exhaust that pressure is to enable the workload to either return to the ready to "fire" position, or to allow insertion of the workload into the working chamber with minimal resistance. In other words, return, or insertion, of the workload will produce an increased pressure as the volume that fluid occupies decreases as the workload is moved to the ready position.

An example of such an exhaust valve to reduce this "back pressure" is that which exhausts through the inlet valve to atmosphere when a port is opened by a member, that opens the inlet valve, being retracted to its starting position, for example by using the residual pressurised fluid behind the workload. However, combining such opening member with the need to reveal an exhaust port requires higher loading in some situations than desired as the opening member may be forced back against a spring or similar, which has sufficient force to also fire the opening member. In this application, the return of the workload may be impeded. In such an application, also the exhaust port may be open while the pressurised fluid is still doing work on the workload. This results in an inefficient use of the charge of the pressurised fluid as high pressures are then vented to atmosphere, or similar low pressure, rather than performing work on the workload. Also, whilst a simple solution, it creates complicated sealing and manufacturing and makes the overall assembly less compact.

A further exhaust solution is known that that avoids the high force and some of the inefficiency issues associated with opening an exhaust valve while the working fluid is still potentially acting on the work load. However, this is mechanically complex and requires numerous sealing elements and other manufacturing and assembly issues and overall is a less compact solution.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved trigger valve for a pressurised fluid engine or device, or to provide a reliable, repeatable trigger valve for a pressurised fluid engine, or to overcome the above shortcomings or address the above desiderata, or to at least provide the public with a useful choice.

BRIEF DESCRIPTION OF THE INVENTION

In a first aspect the present invention consists in a actuation trigger for a device, comprising or including, A dose chamber to hold a charge of high pressure working fluid, received from a high pressure source, A dose valve, biased closed to seal the dose chamber off from a working chamber, and hold the charge in the dose chamber, A hammer operated by a piston with a driven chamber on a first side of the piston, and a trigger chamber on a second side of the piston, sealed from the first side, the driven chamber receiving high pressure working fluid directly or indirectly from the high pressure source, A trigger valve to selectively supply high pressure working fluid to the trigger chamber, or to release high pressure working fluid from the trigger chamber, Such that when the hammer has high pressure working fluid in both the driven chamber and the trigger chamber it is held by a force imbalance in a first position, and when the high pressure working fluid is released from the trigger chamber, the hammer is driven to, or towards a second position towards the trigger chamber, The hammer, when driven to, or towards the second position strikes the dose valve, unseating the dose valve to unseal the dose chamber and the working chamber thus allowing the charge to enter the working chamber to do work therein.

Preferably the force imbalance results from a greater working area for the high pressure working fluid on the trigger chamber side of the piston, than the working area for the high pressure working fluid on the driven chamber side of the piston.

Preferably the trigger valve is a sliding spool valve.

Preferably when the dose valve is open from the dose chamber to the working chamber, there is no supply from the high pressure source to the dose chamber, whether via the trigger valve or otherwise.

Preferably the trigger valve acts to selectively release high pressure working fluid to ambient from, or supply, directly or indirectly, high pressure working fluid from the high pressure source to, any of the dose chamber, driven chamber or trigger chambers ("operative chambers"), in order to trigger the device, which trigger valve has at least two positions:

A first valve position to supply the operative chambers directly or indirectly from the high pressure source, to a ready to work state, wherein the trigger valve,
Opens supply to the dose chamber, and closes any vent path therefrom, and
Opens supply to the dose chamber and trigger chamber to prepare for, but not to actuate the dose valve opening, A second valve position to actuate the device and close supply from the high pressure source, wherein the trigger valve,
Closes supply to the device and specifically to the dose chamber and the trigger chamber, and
Vents the trigger chamber to ambient.

Preferably the trigger valve has a third valve position to make the device safe, wherein the trigger valve,
Blocks supply into the dose chamber,
Vents the dose chamber to ambient, and
Optionally vents the one or more of the remaining operative chambers.

Preferably when the trigger valve closes supply to the device, the high pressure working fluid is prevented from leaving the high pressure source.

Preferably the trigger chamber, when supplied, fills ahead of the dose chamber.

Preferably the hammer slides along a first sliding axis and the dose valve slides along a second sliding axis.

Preferably the first sliding axis and second sliding axis are at least parallel and preferably are concentric.

Preferably the dose valve is an annular ring that has an annular ring sealing surface to seal off the dose chamber from the working chamber.

Preferably the dose valve is biased closed by a spring.

Preferably the hammer has an elastic element on the first and/or second side to aid or retard the force imbalance.

Preferably the hammer is returned to, or toward the first position, at least in part by the dose valve or a return of high pressure working fluid to the trigger chamber.

Preferably the hammer is acted upon by pressure in the working chamber to retard its continued movement in the direction of the dose valve.

Preferably the work load is:
captive within the working chamber, for example a piston or similar, or
not captive and is expelled from the working chamber, for example a projectile or similar, or
a pressure wave within the working chamber to otherwise perform work.

Preferably the high pressure working fluid is a compressible or incompressible fluid.

Preferably the high pressure working fluid is in a range of 15 bar to 100 bar.

Preferably the fluid is a gas.

Preferably the workload is captive within the working chamber, for example a piston or similar, or is not captive and is expelled from the working chamber, for example a projectile or similar, or is a pressure wave within the working chamber to otherwise perform work.

Preferably there is an exhaust valve wherein,
a work load to do the work on, within, or from the working chamber, is driven from a first end of the working chamber to or towards an opposing, second end of the working chamber, using the high pressure working fluid on a rear surface of the workload,
a fluid pressure is received into a return chamber from a front surface or region of the work load, the fluid pressure formed at least in part as a result of the work load moving down the working chamber towards the second end,
the exhaust valve, adapted to open as a result of the fluid pressure in the return chamber acting on a working face of the exhaust valve, the exhaust valve, when opened, allowing high pressure working fluid in the working chamber present on the rear surface to exhaust from the working chamber to a lower or ambient pressure location, the high pressure working fluid exiting via the side wall of the working chamber through to the exhaust valve,
thus producing a pressure difference from the front surface to the rear surface to thus return the work load from the second end to, or toward, the first end.

Preferably the exhaust valve exhausts the working fluid at an angle that is not parallel to a longitudinal axis running between the first end and the second end, rather than substantially parallel to the longitudinal axis.

Preferably the exhaust from the working chamber is at or near to a right angle relative to the longitudinal axis.

Preferably the exhaust valve defines at least in part, an exhaust chamber along the flow path from the side wall through the exhaust valve, before the exhaust to the lower or ambient pressure.

Preferably pressure areas (front and back) of the exhaust chamber are different from each other, allowing a force to be realised on the exhaust valve based on the pressure in the exhaust chamber.

Preferably a net force acts on the exhaust valve to overcome or increase the bias closed, the net force created from either, or both of, varying the effective pressure areas or pressure, on a first side of the exhaust valve, in fluid communication with the rear surface and/or a second side of the exhaust valve, in fluid communication with the front surface.

Preferably the net force varies with time.

Preferably the exhaust valve slides parallel to the longitudinal axis.

Preferably the exhaust chamber pressure areas are at least in part achieved by the sealing of the exhaust valve front and back, and on the inner and outer diameters.

Preferably working fluid flowing from the working chamber into the exhaust chamber, results in an exhaust chamber pressure, which holds the exhaust valve open.

Preferably one or more fluid connection ports, or the summation of those ports, connect the working chamber to the exhaust chamber and are not of the same size or flow capacity as the exhaust from the exhaust chamber to lower or ambient pressure, resulting in different flow capacity into and out of the exhaust chamber.

Preferably the lower pressure is atmospheric or the ambient about the device.

Preferably there is a check valve from the lower pressure into the return chamber.

Preferably the check valve opens if there is a pressure imbalance between the front of the workload and the rear of the workload when the exhaust valve is open.

Preferably the check valve is located in the exhaust valve, between the exhaust chamber and the return chamber.

Preferably the check valve is provided by an o-ring x-ring, lip seal, or other continuous or variable cross section sealing element that moves to block flow from the return chamber into the exhaust chamber, but allows flow from the exhaust chamber into the return chamber.

Preferably the check valve opens when the pressure in the exhaust chamber exceeds that of the return chamber, in so doing the exhaust chamber pressure can then recirculate and act on the front face of the work load to help drive it back to the first end.

Preferably the return chamber is located externally and surrounding the working chamber.

Preferably the exhaust valve is at or towards the first end.

Preferably the exhaust valve is an annular ring that can translate along the longitudinal axis running from the first end to the second end.

Preferably the longitudinal axis is a major axis of the working chamber.

Preferably the annular ring lies outside the working chamber.

Preferably the return chamber receives the working fluid under pressure from the working chamber via at least one fluid connection therebetween.

Preferably a first of the at least one fluid connection is at or toward the second end of the working chamber.

Preferably a second of the at least one fluid connection is between the first end and the first fluid connection.

Preferably the second fluid connection includes a one way valve from the working chamber to the return chamber.

Preferably there is a baffle within the return chamber, between the working face of the exhaust valve and the receipt of fluid from the working chamber.

Preferably there is one or more apertures in the baffle to slow the development of pressure against the working face compared to the development of pressure on the opposing side of the baffle.

In another aspect the present invention consists in a high pressure fluid operating system, comprising or including,
A dose chamber to hold a charge of high pressure working fluid, the dose chamber in fluid communication with a first side of a piston operatively connected to a hammer, and the dose chamber in selective fluid communication with a second side of the piston,
The piston being in a force imbalance in a first position when supplied with high pressure working fluid on both the first side and the second side, and the piston being in a force imbalance when high pressure working fluid is selectively removed from the second side of the piston and urged to move to, or towards a second position to do work.

Preferably the hammer is held in the first position by the force imbalance from an equal pressure between the trigger and driven chamber, the pressure areas in the trigger and driven chamber being different, resulting in a net greater force towards the first position.

Preferably there are elastic elements on either, or both the first or second sides.

Preferably the high pressure working fluid is a compressible fluid.

Preferably the high pressure working fluid is in a range of 15 bar to 90 bar.

Preferably the fluid is a gas.

Preferably when a dose valve is open from the dose chamber to the working chamber, there is no supply from the high pressure source to the dose chamber, whether via the trigger valve or otherwise.

Preferably the device includes an exhaust valve, comprising or including,
- a work load, within, or operable on by, a working chamber which can selectively receive some or all of the charge of high pressure working fluid from the dose chamber, the work load driven from a first end of the working chamber to or towards an opposing, second end of the working chamber, using the high pressurised working fluid on a rear surface of the work load,
- a fluid pressure received into a return chamber from a front surface of the work load, the fluid pressure formed at least in part as a result of the work load moving down the working chamber towards the second end,
- the exhaust valve adapted to open as a result of the fluid pressure in the return chamber acting on a working face of the exhaust valve, the exhaust valve, when opened allowing high pressure working fluid in the working chamber present on the rear surface to exhaust from the working chamber to a lower pressure location, the high pressure working fluid exiting via the side wall of the working chamber through to the exhaust valve,
- thus producing a pressure difference from the front surface to the rear surface to thus return the work load from the second end to, or toward, the first end.

In yet another aspect the present invention consists in an actuation trigger for a device, comprising or including,
- A dose chamber to hold a charge of high pressure working fluid, received from a high pressure source,
- A dose valve, biased closed to seal the dose chamber off from a working chamber, and hold the charge in the dose chamber, openable under controlled action to allow the charge into the working chamber,
- A trigger valve to selectively supply high pressure working fluid from the high pressure source, to the dose chamber, and to control opening and closing of the dose valve, whether directly or indirectly,
- Wherein when the dose valve is open from the dose chamber to the working chamber, there is no supply from the high pressure source to the dose chamber, whether via the trigger valve or otherwise.

Preferably a sliding spool valve, having,
- A first valve position to supply the dose chamber directly or indirectly from the high pressure source, to a ready to work state, wherein the trigger valve,
  - Opens supply to the dose chamber, and closes any vent path therefrom, and
  - Opens supply to any other operative chambers to prepare for, but not to actuate the dose valve opening,
- A second valve position to actuate the device and close supply from the high pressure source, wherein the trigger valve,
  - Closes supply to the device and specifically to the dose chamber, and
  - Allow the other operative chambers to actuate the dose valve opening.

Preferably the trigger valve has a third valve position to make the device safe, wherein the trigger valve,
- Blocks supply into the dose chamber, and
- Vents the other operative chambers.

Preferably there is an exhaust valve, comprising or including,
- a work load, within the working chamber, driven from a first end of the working chamber to or towards an opposing, second end of the working chamber, using a pressurised fluid on a rear surface of the work load,
- a fluid pressure is received into a return chamber from a front surface of the workload, the fluid pressure formed at least in part as a result of the workload moving down the working chamber towards the second end,
- the exhaust valve adapted to open as a result of the fluid pressure in the return chamber, acting on a working face of the exhaust valve, the exhaust valve, when opened allowing high pressure working fluid in the working chamber present on the rear surface to exhaust from the working chamber to a lower pressure location, the high pressure working fluid exiting via the side wall of the working chamber through to the exhaust valve,
- thus producing a pressure difference from the front surface to the rear surface to thus return the work load from the second end to, or toward, the first end.

In another aspect the present invention consists in an actuation trigger for a device, comprising or including,
- A trigger valve to selectively control a supply of high pressure working fluid from a high pressure source to one or more operative chambers to in turn control a working chamber, which working chamber uses a charge of high pressure working fluid to act on a work load, wherein the trigger valve has,
  - A first valve position to supply the one or more operative chambers directly or indirectly from the high pressure source, to a ready to work state, wherein the trigger valve,
    - Opens supply to the one or more operative chambers, and
    - closes any vent path to ambient pressure therefrom, to prepare for, but not for, the working chamber to do work,
  - A second valve position to actuate the device wherein the trigger valve, Closes or opens the supply to the one or more operative chambers, thereby allowing the work chamber to be charged and do the work,
  - A third valve position to make the device safe wherein the trigger valve,
    - Closes supply from the high pressure source to the one or more operative chambers, or
    - discharges the one or more operative chambers to ambient pressure, making the device unable to actuate or inert.

Preferably the trigger valve is any one or more of a rotary valve (whether ball or otherwise), sliding spool valve, a two or more way directional control valve, or any combination thereof.

Preferably the one or more operative chambers control a charge valve to deliver the charge into the working chamber.

Preferably there is an exhaust valve wherein,
  the work load is driven within, or from, the working chamber, from a first end of the working chamber to, or towards, an opposing, second end of the working chamber, using the high-pressure working fluid on a rear surface or region of the work load, a fluid pressure is received into a return chamber from a front surface or region of the work, the fluid pressure formed at least in part as a result of the work moving down the working chamber towards the second end,
  the exhaust valve adapted to open as a result of the fluid pressure in the return chamber acting on a working face of the exhaust valve, the exhaust valve, when opened allowing high pressure working fluid present in the working chamber present on the rear surface to exhaust from the working chamber to a lower pressure location, the high pressure working fluid exiting via the side wall of the working chamber through to the exhaust valve,
  thus producing a pressure difference from the front surface to the rear surface to thus return the work load from the second end to, or toward, the first end.

Preferably there is no direct path from the high-pressure source to the working chamber, regardless of the position of the trigger valve.

In yet another aspect the present invention consists in a device, comprising or including,
  A dose chamber to hold a charge of high-pressure working fluid, received from a high-pressure source,
  A dose valve, biased closed to seal the dose chamber off from a working chamber, and hold the charge in the dose chamber,
  A hammer operated by a piston with a driven chamber on a first side of the piston, and a trigger chamber on a second side of the piston, sealed from the first side, the driven chamber receiving high pressure working fluid working fluid directly or indirectly from the high pressure source,
  A trigger valve to selectively supply high pressure working fluid to the trigger chamber, or to release high pressure working fluid from the trigger chamber, Such that when the hammer has high pressure working fluid in both the driven chamber and the trigger chamber it is held a force imbalance in a first position, and when the high pressure working fluid is released from the trigger chamber, the hammer is driven to, or towards a second position towards the trigger chamber,
  The hammer, when driven to, or towards the second position strikes the dose valve, unseating the dose valve to unseal the dose chamber and the working chamber thus allowing the charge to enter the working chamber to do work therein.

Preferably the force imbalance results from a greater working area for the high pressure working fluid on the trigger chamber side of the piston, than the working area for the high pressure working fluid on the driven chamber side of the piston.

Preferably the trigger valve is a sliding spool valve.

Preferably the trigger valve acts to selectively vent high pressure working fluid to ambient from, or supply, directly or indirectly, high pressure working fluid from the high pressure source to, any of the dose chamber, driven chamber or trigger chambers ("operating chambers"), in order to trigger the device, which trigger valve has at least two positions:

A first valve position to supply the operating chambers directly or indirectly from the high-pressure source, to a ready to work state, wherein the trigger valve, opens supply to the,
    driven chamber and trigger chamber,
    dose chamber, and closes any vent path therefrom, and,
  A second valve position to actuate the device and close supply from the high-pressure source, wherein the trigger valve,
    Closes supply to the device and specifically to the dose chamber and the trigger chamber, and
    Vents the trigger chamber to ambient.

Preferably the trigger valve has a third valve position to make the device safe, wherein the trigger valve,
  Blocks or closes supply into the dose chamber and trigger chamber,
  Vents the dose chamber, and
  Vents the trigger chamber.

Preferably the trigger valve closes supply to the device, the high-pressure working fluid is prevented from leaving the high pressure source.

Preferably the trigger chamber, when supplied, fills ahead of the dose chamber.

Preferably the hammer slides along a first sliding axis and the dose valve slides along a second sliding axis.

Preferably the first sliding axis and second sliding axis are at least parallel and preferably are concentric.

Preferably the dose valve is an annular ring that has an annular ring sealing surface to seal off the dose chamber from the working chamber.

Preferably the dose valve is biased closed by a spring.

Preferably the hammer has an elastic element on the first and/or second side to aid or retard the force imbalance.

Preferably the hammer is returned to, or toward the first position, at least in part by the dose valve, or a return of high-pressure working fluid to the trigger chamber.

Preferably the work is, or acts on a load that is:
  captive within the working chamber, for example a piston or similar, or
  not captive and is expelled from the working chamber, for example, a projectile or similar, or
  a pressure wave within the working chamber to otherwise perform work.

Preferably the high pressure working fluid is a compressible fluid.

Preferably the high pressure working fluid is in a range of 15 bar to 90 bar.

Preferably the high pressure working fluid is a gas.

Preferably there is an exhaust valve, comprising or including,
  a work load to do the work on, within, or from the working chamber, is driven within, or from, the working chamber, from a first end of the working chamber to, or towards, an opposing, second end of the working chamber, using the high-pressure working fluid on a rear surface of the work,
  a fluid pressure is received into a return chamber from a front surface of the work load, the fluid pressure formed at least in part as a result of the work load moving down the working chamber towards the second end,
  the exhaust valve, adapted to open as a result of the fluid pressure in the return chamber, acting on a working face of the exhaust valve, the exhaust valve, when opened allowing high pressure working fluid in the working chamber present on the rear surface to exhaust from the working chamber to a lower pressure location, the high pressure working fluid exiting via the side wall of the working chamber through to the exhaust valve, thus producing a pressure difference from the front surface to the rear surface to thus return the work load from the second end to, or toward, the first end.

In another aspect the present invention consists in a method of actuating a device, comprising or including the steps of, Charging a dose chamber with a charge of high pressure working fluid, Charging a driven chamber on a first side of a hammer, with a high pressure working fluid, Charging a trigger chamber on a second side of the hammer with a high pressure working fluid, the first side and second side separated by a piston operatively connected to the hammer, such that the hammer is held in a force imbalance in a first position, Releasing the high pressure working fluid from the trigger chamber to drive the hammer to, or towards a second position, Actuating a dose valve by the hammer impacting thereon when in, or towards, the second position, to unseat the dose valve from a sealing position, where the dose valve seals the dose chamber from a working chamber, to an unsealed position such that the charge enters the working chamber to do work therein.

Preferably the force imbalance is at least in part provided or retarded by a bias, such as a spring.

Preferably the step of returning the hammer to, or towards the first position, at least in part by the dose valve acting on the hammer of part thereof, or a return of high pressure working fluid to the trigger chamber.

Preferably the high pressure working fluid is supplied, directly or indirectly, from a high pressure source.

Preferably the method includes the step of charging the driven chamber, directly or indirectly from the high pressure source.

Preferably the method includes the step of selectively charging the trigger chamber and the dose chamber, or releasing the trigger chamber, and or dose chamber, via a trigger valve.

Preferably the trigger valve is a sliding spool valve.

Preferably the trigger valve acts to selectively release high pressure working fluid to ambient from, or supply, directly or indirectly, high pressure working fluid from the high pressure source to, any of the dose chamber, driven chamber or trigger chambers ("operative chambers"), in order to trigger the device, which trigger valve has at least two positions:

A first valve position to supply the operative chambers directly or indirectly from the high pressure source, to a ready to work state, wherein the trigger valve,
Opens supply to the dose chamber, and closes any vent path therefrom, and
Opens supply to any other chambers to prepare for, but not to actuate the dose valve opening, A second valve position to actuate the device and close supply from the high pressure source, wherein the trigger valve,
Closes supply to the device and specifically to the dose chamber and the trigger chamber, and
Allow the operative chambers to actuate the dose valve opening.

Preferably the trigger valve has a third valve position to make the device safe, wherein the trigger valve,
Blocks supply into the dose chamber, and
Vents the other chambers.

Preferably the method includes the step of when the dose valve is open from the dose chamber to the working chamber, there is no supply from the high pressure source to the dose chamber, whether via the trigger valve or otherwise.

Preferably the method includes providing an exhaust valve, comprising or including the steps of, Driving a work load by the work, within, or from, the working chamber, from a first end of the working chamber to or towards an opposing, second end of the working chamber, using a the high pressure working fluid on a rear surface of the workload, Receiving a fluid pressure into a return chamber from a front surface of the workload, the fluid pressure formed at least in part as a result of the work load moving down the working chamber towards the second end, Opening the exhaust valve, as a result of the fluid pressure in the return chamber, acting on a working face of the exhaust valve, the exhaust valve, when opened allowing high pressure working fluid in the working chamber present on the rear surface to exhaust from the working chamber to a lower pressure location, the high pressure working fluid exiting via the side wall of the working chamber through to the exhaust valve, thus producing a pressure difference from the front surface to the rear surface to thus return the work load from the second end to, or toward, the first end.

Preferably the exhaust valve exhausts the fluid pressure at an angle that is not parallel to a longitudinal axis running between the first end and the second end, rather than substantially parallel to the longitudinal axis.

Preferably the exhaust from the working chamber is at or near to a right angle relative to the longitudinal axis.

Preferably the exhaust valve defines at least in part, an along the flow path from the side wall through the exhaust valve, before the exhaust to the lower pressure.

Preferably pressure areas (front and back) of the exhaust chamber are different from each other, allowing a force to be realised on the exhaust valve based on the pressure in the exhaust chamber.

Preferably a net force acts on the exhaust valve to overcome or increase the bias closed, the net force created from either of both of varying the effective pressure areas or pressure, on a first side of the exhaust valve, in fluid communication with the rear surface and/or a second side of the exhaust valve, in fluid communication with the front surface.

Preferably the net force varies with time.

Preferably the exhaust valve slides parallel to the longitudinal axis.

Preferably the exhaust chamber pressure areas are at least in part achieved by the sealing of the exhaust valve front and back, and on the inner and outer diameters.

Preferably fluid pressure flowing from the working chamber into the exhaust chamber, results in an exhaust chamber pressure, which holds the exhaust valve open.

Preferably one or more fluid connection ports, or the summation of those ports, connect the working chamber to the exhaust chamber and are not of the same size or flow capacity as the exhaust which connects the exhaust chamber to lower or ambient pressure, resulting in different flow capacity into and out of the exhaust chamber.

Preferably the lower pressure is atmospheric or ambient about the device.

Preferably there is a check valve from the lower pressure into the return chamber.

Preferably the check valve opens if there is a pressure imbalance between the front of the workload and the rear of the workload when the exhaust valve is open.

Preferably the check valve is located in the exhaust valve, between the exhaust chamber and the return chamber.

Preferably the check valve is provided by an o-ring x-ring, lip seal, or other continuous or variable cross section sealing element that moves to block flow from the return chamber into the exhaust chamber, but allows flow from the exhaust chamber into the return chamber.

Preferably the check valve opens when the pressure in the exhaust chamber exceeds that of the return chamber, in so doing the exhaust chamber pressure can then recirculate and act on the front face of the work load to help drive it back to the first end.

Preferably the return chamber is located externally and surrounding the working chamber.

Preferably the work load is captive within the working chamber, such as, but not limited to a piston, or is not captive and is expelled from the working chamber, such as, but not limited to a projectile or, or is a pressure wave within the working chamber to otherwise perform work.

Preferably the exhaust valve is at or towards the first end.

Preferably the exhaust valve is an annular ring that can translate along the longitudinal axis running from the first end to the second end.

Preferably the longitudinal axis is a major axis of the working chamber.

Preferably the annular ring lies outside the working chamber.

Preferably the return chamber receives the working fluid under pressure from the working chamber via at least one fluid connection therebetween.

Preferably a first of the at least one fluid connection is at or toward a second end of the working chamber.

Preferably a second of the at least one fluid connection is between the first end and the first fluid connection.

Preferably the second fluid connection includes a one way valve from the working chamber to the return chamber.

Preferably there is a baffle within the return chamber, between the working face of the exhaust valve and the receipt of fluid from the working chamber.

Preferably there is one or more apertures in the baffle to slow the development of pressure against the working face compared to the development of pressure on the opposing side of the baffle.

In another aspect the present invention consists in an actuation trigger for a device as described herein with reference to any one or more of the accompanying drawings.

In another aspect the present invention consists in a high pressure working fluid operating system as described herein with reference to any one or more of the accompanying drawings.

In another aspect the present invention consists in an device as described herein with reference to any one or more of the accompanying drawings.

In another aspect the present invention consists in a method of actuating a device as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Preferred embodiments of the invention will now be described with reference to FIGS. 1 through 12.

Figure 1:
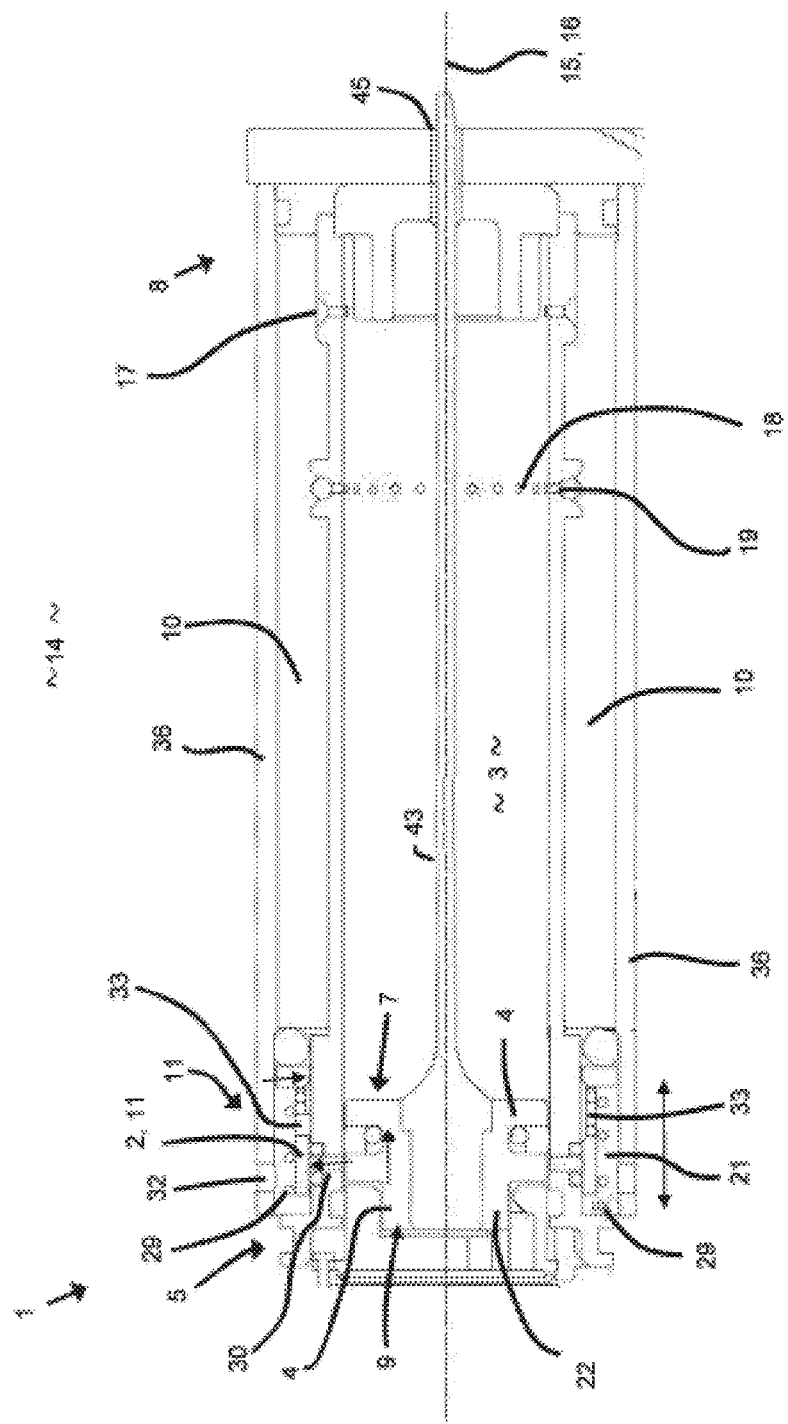
FIG. 1 Shows a vertical cross section through a pressurised fluid powered device that includes an exhaust valve for use with the present invention, the exhaust valve closed, the workload is to or towards the first end ready to be worked on, FIG. 2 Shows a similar view to that of FIG. 1, where the workload has moved down the working chamber under action of the working fluid, and pressure as a result of this movement has activated the exhaust valve to open, FIG. 3A Shows a similar view to FIG. 1 with detail of a check valve into the return chamber, to reduce pressure differential between the front and back of the work load, to enable better return stroke of the workload in the ready state with the check valve closed, FIG. 3 B just as the workload begins to move down the working chamber the check valve is closed, and FIG. 3 C the work load is moving back up the chamber and if there is any pressure differential between the front of the workload, and the rear, the check valve will open, FIG. 3 D showing in isometric a reed valve to perform the check valve function.
Figure 4:
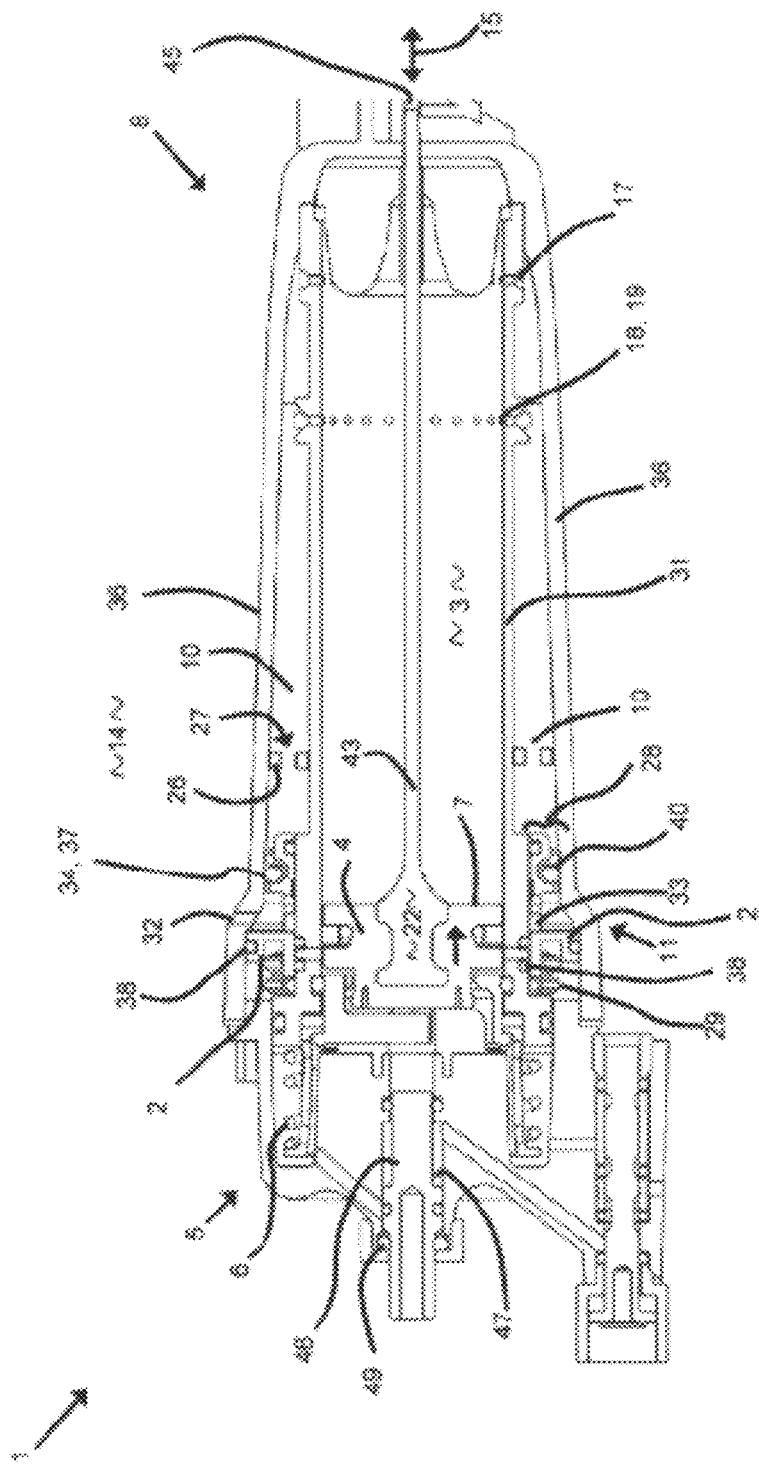
FIG. 4 shows a similar view of a vertical cross section along the longitudinal axis of an air engine of the present invention with the trigger valve showing a further variation of the exhaust valve which incorporates the check valve, the air engine being in a ready state, the exhaust valve closed, and the work load ready to be energised.

A device 1 that operates on high pressure working fluid is shown in FIG. 1, and more particularly in FIG. 4, the example shown is from a nail or fastening gun. However, the arrangement could be used in any device that utilises high pressure working fluid (also referred interchangeably as high pressure fluid herein) to do work on a workload.

It is to be understood the high pressure working fluid could be a highly compressed gas, a liquid or similar working material that flows under high pressure. In the preferred form of the present invention the high pressure working fluid is a non-combustible one in the working range of the fluid this invention applies to.

The device 1 consists of a workload 4 that is received in a working chamber 3. The working chamber is in part defined by a side wall 31. In this example the working chamber is of constant cross section and is cylindrical, incorporating the side wall 31. However, the working chamber 3 may be of different cross-section to circular and may take any shape necessary for example, but not limited to oval, square or other shape. In most instances the working chamber will be of constant cross section along its length. However in some specialist applications, it may change cross section and the work load will be able to adapt to this change in cross section.

The workload 4 may be a piston as shown, for example as used in a fastening gun such as for nails, or used in a pest control trap, and is therefore captive. Alternatively the workload 4 may be non-captive such as a projectile or similar that is ejected from the working chamber 3, or a pressure wave that is otherwise utilised.

In the examples shown the workload 4 is a piston 22, that also carries a striker or anvil 43. The striker or anvil 43 may do work on a fastener, for example a nail, as a result of travel of the workload 4. Alternatively the striker may be of a different form to achieve a different result, for example it may be flat or otherwise contoured to act to dispatch a pest or similar by delivering energy into an organic or inorganic body.

In other forms the device may release a charge of high pressure working fluid into the working chamber, or from the working chamber to do the work. This work may be a pressure wave from the device to have an effect on an actual object as a work load in the work chamber, whether captive as a reciprocating piston, or to be moved or expelled therefrom as a projectile. Alternatively, the work may be to send a pressure wave from the working chamber or from the device to have an effect external to the device.

The working chamber 3 and device 1 have a first end 5 and a second end 8, and the workload 4 has a rear surface 9 and a front surface 7. The workload 4 in doing work moves from the first end 5 to the second end 8.

As shown, there is a return chamber 10. In the preferred form, as shown, the return chamber 10 is annular and surrounds the working chamber 3. In this arrangement the outer or external surface of the side wall 31 defines part of the return chamber 10 as shown for example in FIG. 2. However, the return chamber 10 may take other forms and may only partially encircle the working chamber 3, may not be defined in part by the side wall, or may be separate there from. For example, though not shown, the return chamber may be a separate volume that is only fluidly attached to the working chamber by a conduit, flexible or otherwise.

The return chamber 10 is in fluid communication with the working chamber 4, at least from near the second end 8. In the example shown there are two paths of fluid communication, a first fluid communication 17 adjacent or toward the second end 8, and a second fluid communication 18 intermediate the second end 8 and the first end 5.

Fluidly connected to the return chamber 10 is the working face 28 of an exhaust valve 2, as shown in FIG. 1. A valve member 37, for example an o-ring 34 as see in FIG. 2 forms part of the working face 28. In the examples shown the exhaust valve 2 is annular and can slide back and forth along a valve sliding axis, in this case that is the longitudinal axis 15 of the device. The longitudinal axis in this case is an axis parallel to the line of motion, or sliding axis of the work load. In the embodiment shown, this also happens to be the central, major axis of the working chamber. The working face 28 is that face, or those faces with a surface normal parallel to the valve sliding axis, in this example the longitudinal axis 15, as these are the faces on which a pressure acting will produce a resultant force in the direction of valve sliding axis of the exhaust valve. Said another way, the working faces (in some instances referred to as effective faces or effective areas) are those that lie in a plane perpendicular to the sliding axis of the component they act on, for example a valve or piston.

However, in other forms the exhaust valve 2 need not be an annular ring, and only need be fluidly connected to perform the exhaust valve function as described. For example, the exhaust valve could be fluidly connected as described here to perform the same functions, but not physically connected to the main body, but could be, and could be a spool valve or similar.

The exhaust valve 2 is normally biased closed by a bias 29 such as a spring as seen in FIG. 1. The exhaust valve 2 in the closed position 11, as seen in FIG. 1, closes an exit 30 in the side wall 31 of the working chamber 3. Thus, the exit or exhaust from the working chamber 3 for this and the other embodiments is through a side wall at or near a right angle to the longitudinal axis of the device 1, or at least not parallel to the longitudinal axis.

In the embodiment shown, and preferably in all embodiments the exhaust valve 2 receives the exhaust through the side wall 31 of the working chamber 3, and preferably the exhaust then exits through a side of the device 1 via exhaust port 32. However, in other forms the exit of the exhaust may be through another region of the device 1, but at least exits out the side wall of the working chamber.

In a further variation, though not shown, the exhaust port may be parallel with the hammer, but offset from the central axis through the rear wall 77. Such a variation could use a spool valve (similar to that of the trigger valve) rather than an annular ring style exhaust valve described above.

However, the exhaust valve 2 may be a separate valving arrangement actuated from the return chamber 10. For example, though not shown, it may be a separate annular piston valve, or other type of valve, for example a spool valve acting in a parallel with, or at an angle to the working chamber 3 or return chamber 10. Similarly, while the return chamber is shown as an annular chamber around the working chamber, this may also be a separate volume in turn connected to the exhaust valve as mentioned above. Such an arrangement may be desirable for many reasons, for example, but not limited to, when the arrangement does not need to be as compact, or the space confines prevent it.

Figure 2:
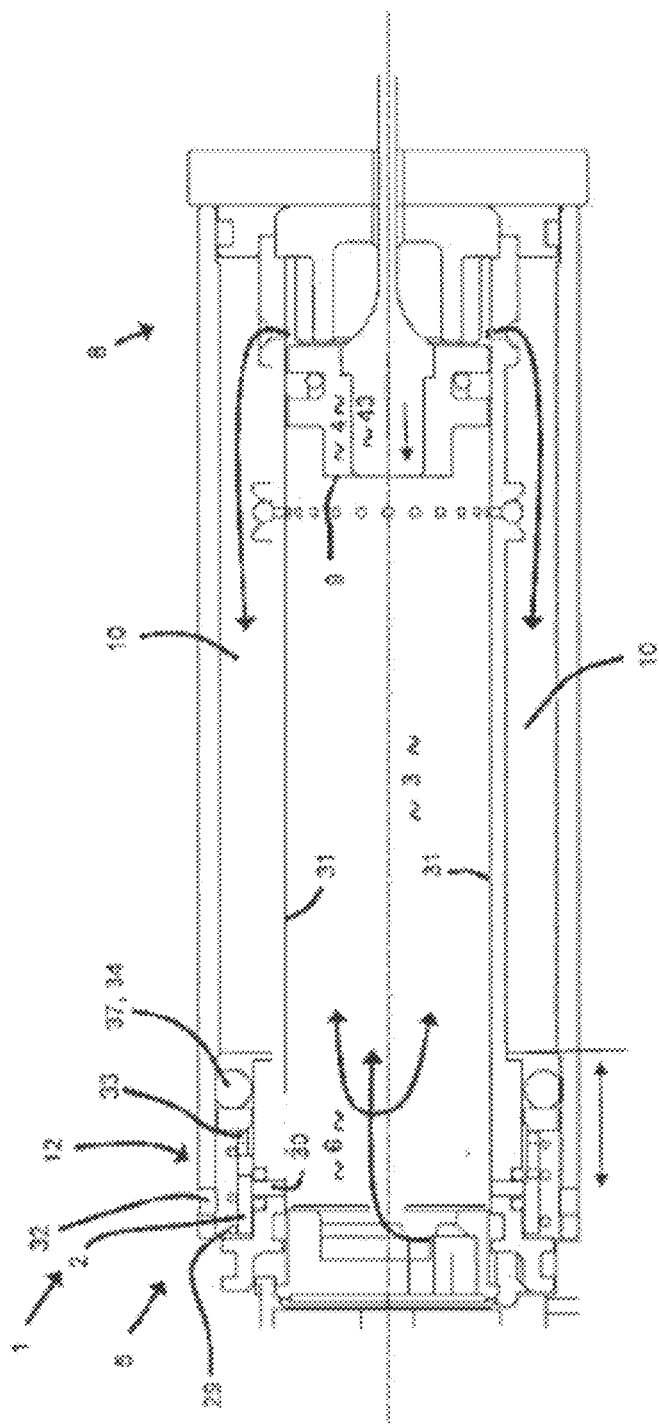

The exhaust valve 2 when in the open position 12 as shown in FIG. 2, slid to the left when compared to the exhaust valve 2 position of FIG. 1, provides an exit or flow path of high pressure working fluid (even if having reduced pressure after doing the work) from the working chamber 3, via the exit 30, through the exhaust valve port 33 to the exhaust 32, as shown by the arrow. In the preferred form the exhaust 32 is at, or exhausts to, a lower pressure, for example to the atmosphere or ambient surroundings 14. The exhaust 32 as shown here is an aperture in the housing 36 of the device 1.

In some instances, as the workload moves or returns to the first end 5 to the ready position there may be a lower pressure on the front surface 7 compared to the rear surface 9, that is a pressure difference in favour of the rear surface 9, or even a pressure balance. This is particularly the case where the work load moves at high speed, and the dynamic effects of the working fluid prevent pressure equalisation or leaks that would otherwise occur in slow speed operation. This pressure on the front surface may be the same fluid as the high pressure working fluid, or it may be different. For example the high pressure working fluid may be compressed carbon dioxide and the fluid on the front surface may be the ambient fluid, for example air.

This pressure difference, or balance would resist the movement of the workload 4 to the first end 5. This is because as the workload 4 moves back to the first end 5 the working fluid there is trapped and compressed with the workload 4 movement. As the return chamber 10 and front surface 7 are a normally closed volume, this will reduce the consistency of return to the ready position at the first end 5, at least the speed of return, and may even prevent return of the workload completely.

Figure 5:
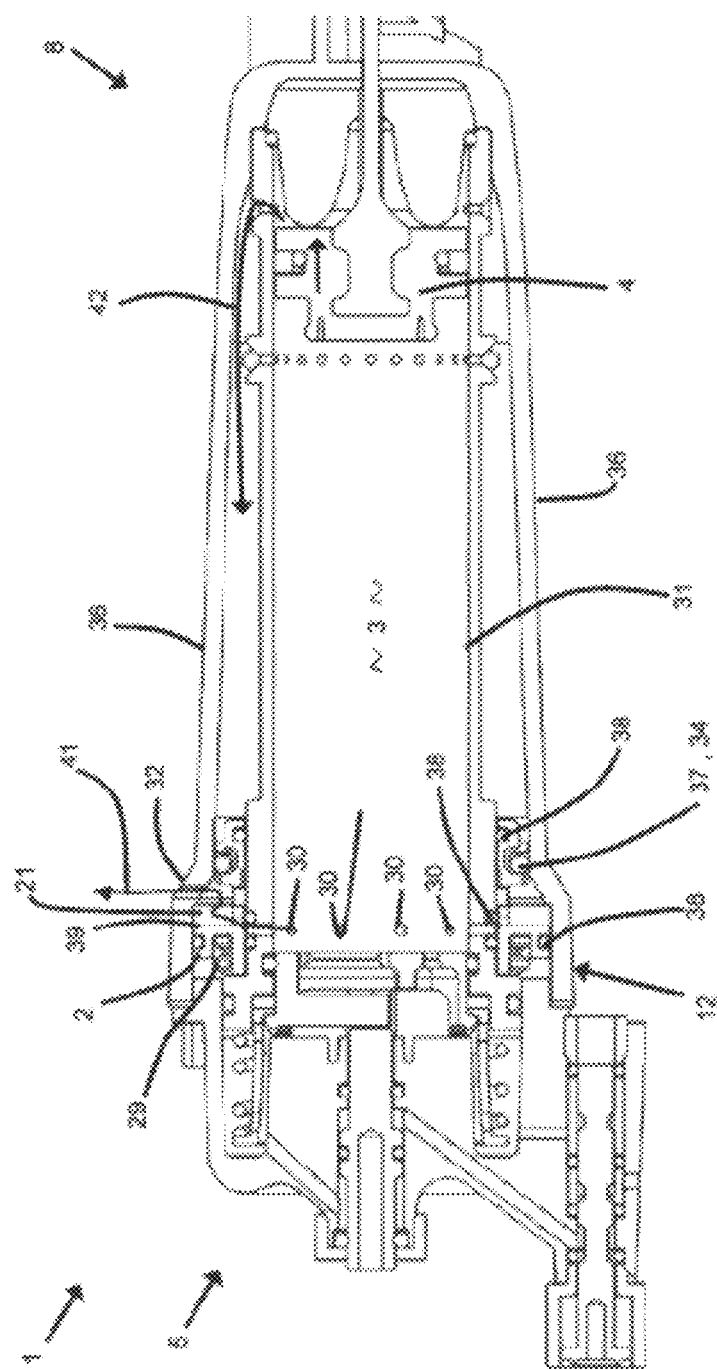
FIG. 5 shows a similar view to FIG. 4 but where the trigger valve has been actuated to the second valve position to release the hammer to impact the dose valve and charge the working chamber thus sending the workload down the working chamber towards the second end, and the exhaust valve is opened under action of pressure in the return chamber, to allow pressure behind the workload to exhaust to atmosphere, the exhaust port from the side of the working chamber being clearly visible.
Figure 6:
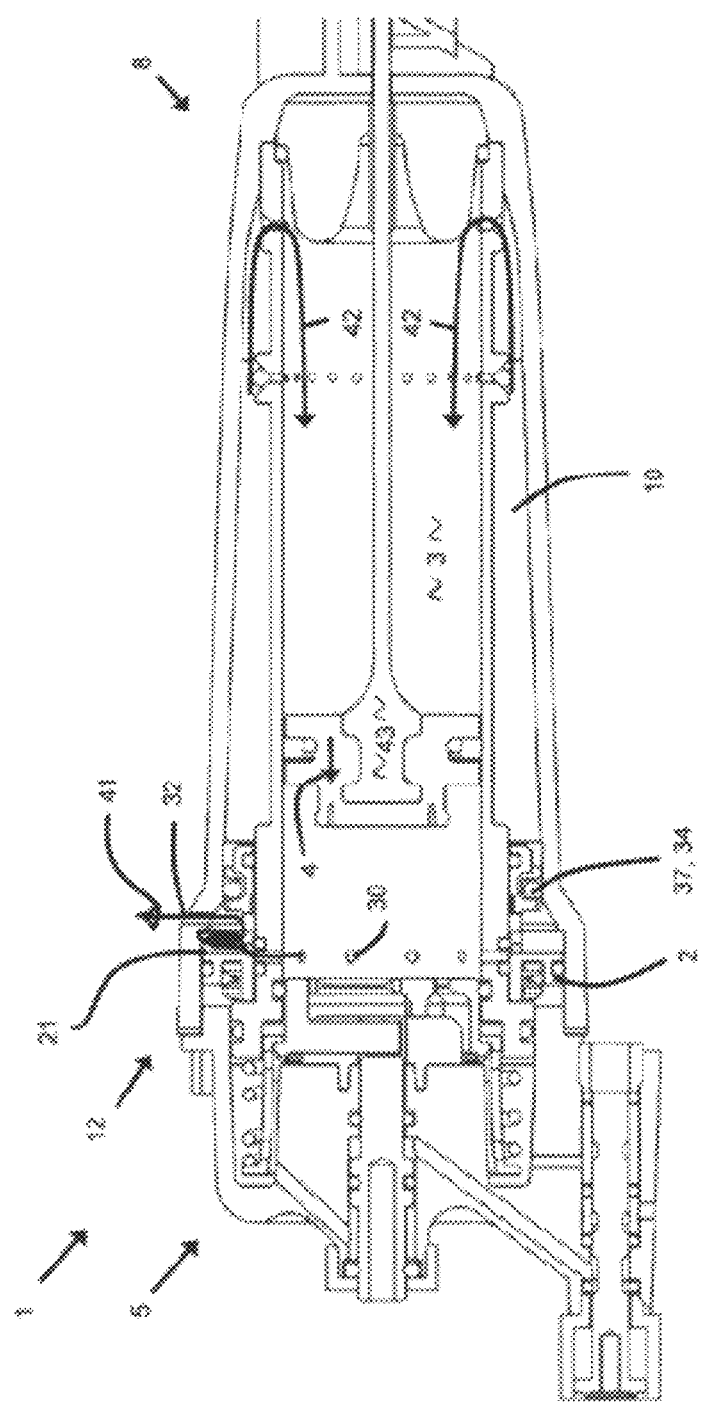
FIG. 6 shows a similar view to that of FIG. 5, where the hammer and piston are ready to return to the pre-strike position, and the workload is returning up the working chamber.

As shown in FIGS. 3A through 3D, in such a case there may be a one way or check valve 23, such as the reed valve 24 shown. The reed valve, being an elastic ring of flat cross section as shown, is biased outwardly by its own elastic properties to normally close chamber port 35. This allows the lower pressure outside the return chamber 10, or at least behind the front surface 7 to equalise through chamber port 35 into the return chamber 10 and to the front surface 7 to even out any pressure imbalance with the rear surface 9. The valve 24 is tuned or selected so it opens at the desired pressure difference. There is a one way valve 19 from the working chamber to the 3 to the return chamber shown at least in FIGS. 2, and 5. The one way valve opens when exposed to any residual pressure behind the work load 4, such as when the work load 4 has travelled to, or towards, the second end 8 as shown in FIGS. 2 and 5. If there is any residual pressure then this will be allowed to pass, via the one way valve 19 from the working chamber 3 into the return chamber 10. Thus the device can capture and utilise any pressure present that has done work on moving the work load to or toward the second end, to return the workload 4 to the first end 5.

In a perfectly sealed system theoretically this should not occur. However, in reality it may occur if there is a bleed of air, for example from in front of the front surface 7 from the anvil port 45 as the workload travels down toward the second end, for example through leakage of seals there or in other places to ambient or atmosphere or similar. Such a check valve 23 would be utilised if there is an undesired pressure imbalance that would act to hinder the work load returning.

Figure 3:
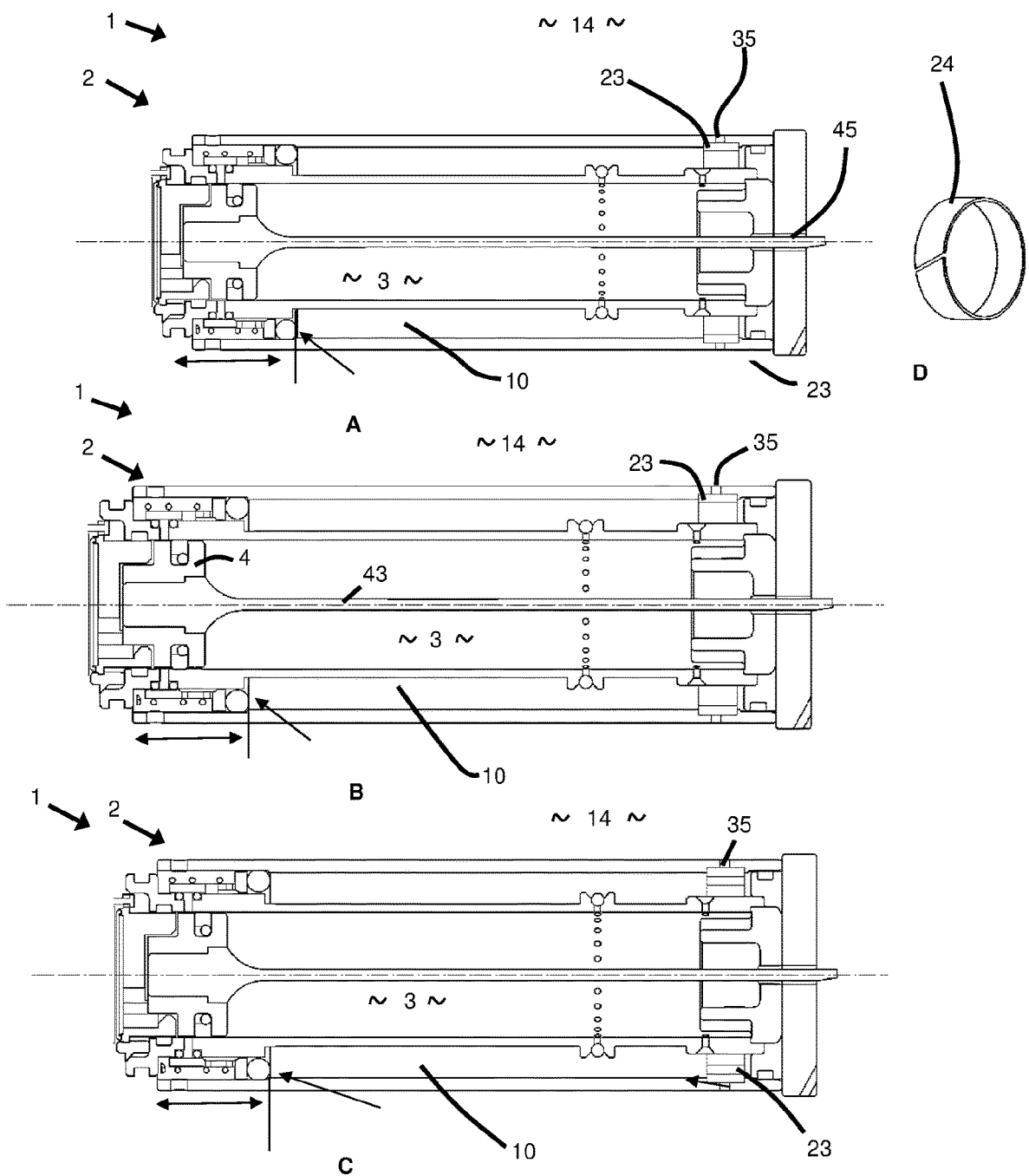

The trigger valve arrangement to actuate the device of FIGS. 1 to 3 and so also actuate the exhaust valve, is shown in FIGS. 4 through 12, showing the trigger valve arrangement and exhaust valve actuated thereby, albeit indirectly. In this variation the one way valve is built into the exhaust valve 2, and in effect allows again allows recirculation into the return chamber 10.

Figure 9:
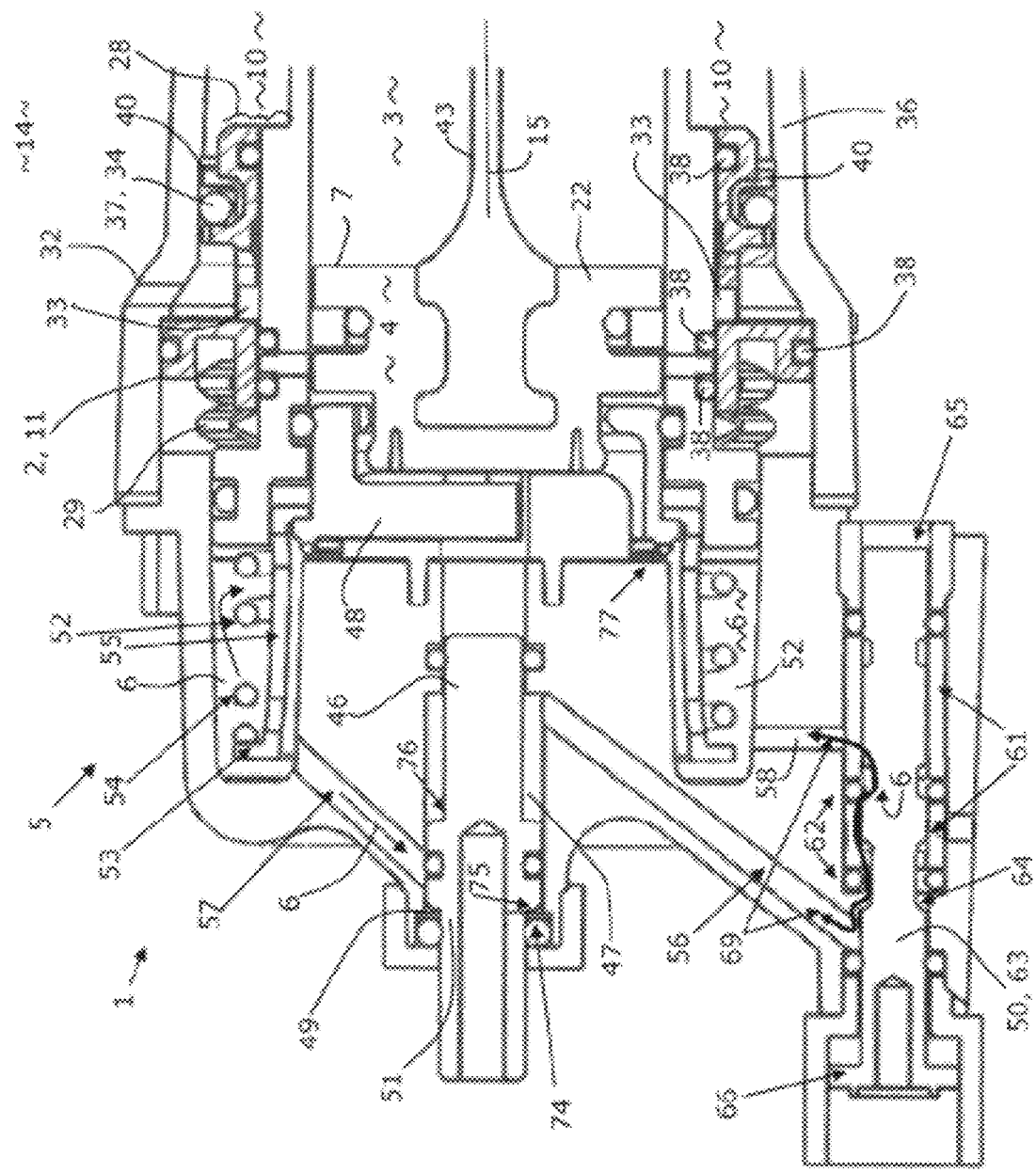
FIG. 9 shows a close up arrangement of the trigger valve of FIG. 4 in the ready to trigger or first valve position, showing the trigger/dump chamber charged and holding the hammer back via the hammer piston, the trigger valve train supplying high pressure working fluid from the dose chamber and high pressure source to the dump chamber.
Figure 10:
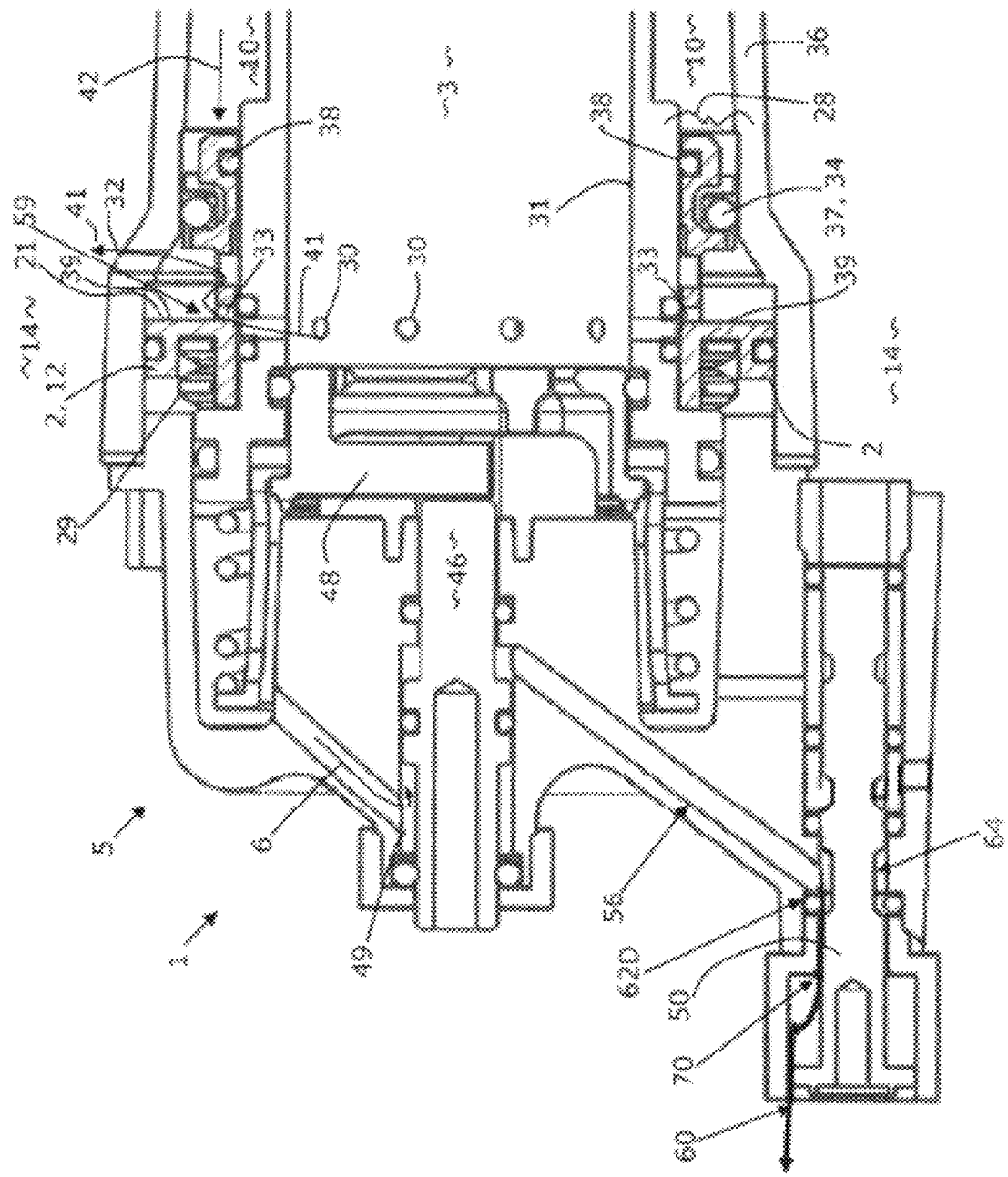
FIG. 10 shows a close up of the arrangement of the trigger valve of FIG. 5, showing the trigger valve in the second valve position, and the valve train now open to dump the high pressure working fluid from the dump/trigger chamber, thus allowing the pressure in the drive chamber to drive the hammer to impact and open the dose valve to charge the working chamber (the workload having moved down the working chamber already, under action of the charge of pressure fluid)

The general architecture of the variation shown in FIGS. 1 through 3 is retained, the exhaust valve 2 (with cross-section lines (to add in FIG. 4) has an exhaust chamber 21 when moving to, and when in, the open position 12 as shown in FIGS. 5, 6, 9, and 10. The exhaust chamber 21 is in fluid connection with the exit 30 in the side wall 31 of the working chamber 3 via the exhaust valve port 33 when the exhaust valve 2 opens 12, such as shown in FIG. 9. The exhaust chamber 21 has a leak path, or flow difference to the exhaust 32 as shown in FIGS. 9 and 10. This flow path difference between into and out of the exhaust chamber 21, or the leak path therefrom, is tuned to create enough pressure in the exhaust chamber 21 to overcome the bias 29. In the situation where the bias 29 has a very low spring constant, then the path difference, or leak path only needs to also be small to general sufficient force.

Thus, when the exhaust valve 2 is actuated to be open, the working fluid, which otherwise would be trapped between the rear surface 9 and the working chamber 3, can now exhaust the working chamber 3 as the workload 4 returns to the first end 5. Thus, a pressure difference is created between the front surface to the rear surface, in favour of an increased pressure on the front surface to thus return the work load from the second end to, or toward, the first end when the exhaust valve opens.

The actuation of the dose valve 48 to deliver the working fluid 6 from the dose chamber 52 to the working chamber to drive the work load 4 for these variations of the device 1 in FIGS. 1 through 13 needs to be triggered. This is controlled by a trigger valve 50 arrangement as shown in FIGS. 4 through 12, and in more detail in FIGS. 8 through 12 in combination with a hammer 46.

Figure 8:
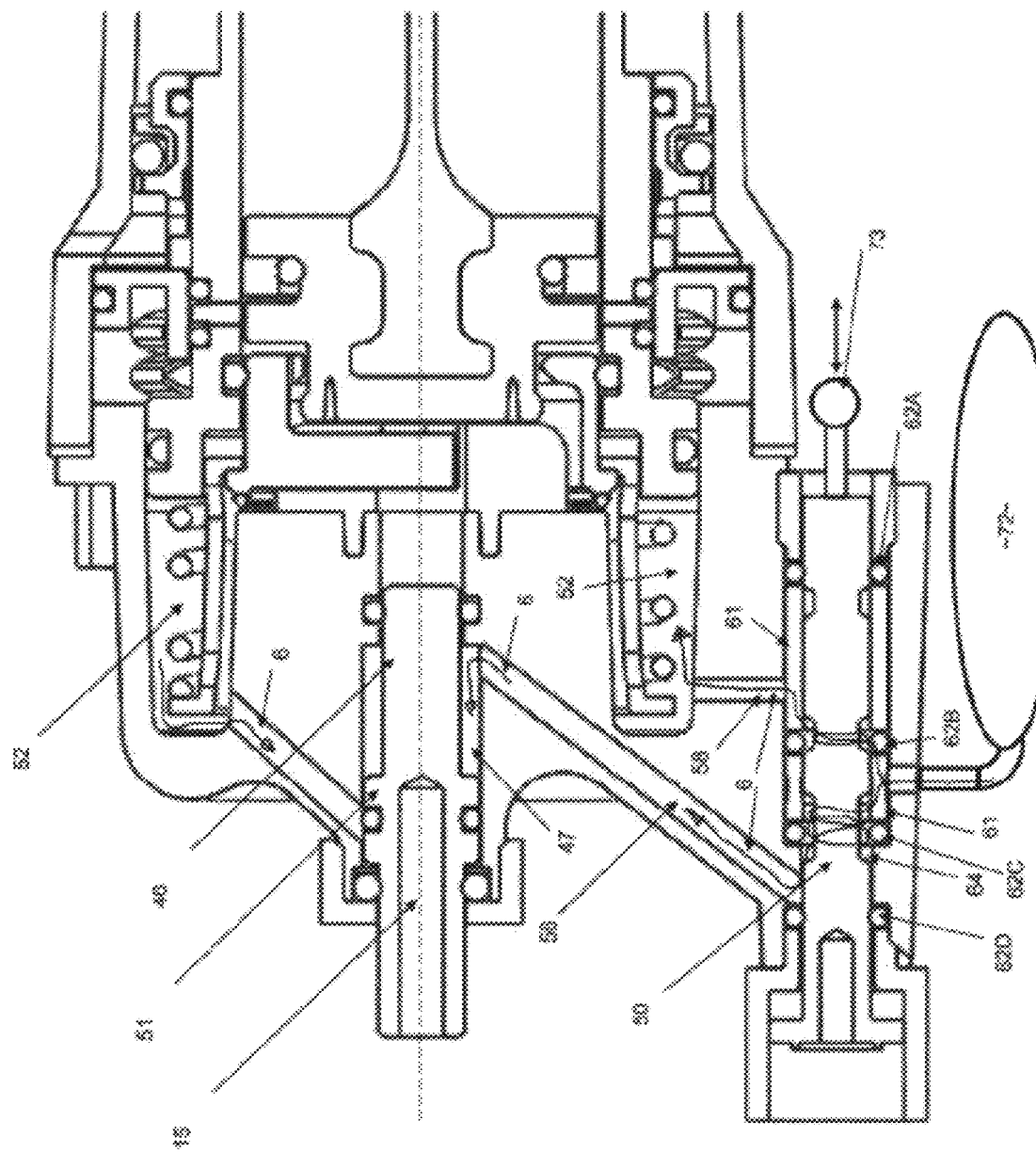
FIG. 8 shows a close up arrangement of the trigger valve from FIG. 4 where the trigger valve is in the ready to trigger or first valve position, and the trigger valve train is pressurised with working fluid from the high pressure source.

The device has a pressurised fluid (e.g. working fluid 6) driven hammer 46 shown in detail in FIG. 8. The hammer 46 can slide linearly, in this case again, parallel with the longitudinal axis 15, as shown when FIG. 8 (hammer 46 all the way to the left) and FIG. 10 (hammer 46 moved to the right) are compared.

When looking at FIG. 10 it can be seen that on the left side of the hammer 46 there is a driven chamber 49, and to the right of the hammer 46 there is a dump chamber or trigger chamber 47 (better seen in FIG. 8). The two chambers are separated by a hammer piston 51 and its seal, which substantially seals the two chambers from each other preventing flow of working fluid from one chamber to the other.

In the preferred variation the pressures acting in the driven chamber 49 and the dump chamber 47 are the same as they are both receiving pressurised working fluid from the same source 72, whether directly or indirectly. In the example shown in FIG. 4, and in more detail in FIG. 8, the driven chamber 49 is pressurised indirectly from the pressure source 72 via the dose chamber. However it may be supplied from the dump chamber 47, or independently of these chambers, for example directly from the source 72. This can be achieved by a direct connection between the source 72 and the driven chamber 49, for example by a conduit between the two.

The hammer piston 51 presents, in the driven chamber 49, a driven effective area 75, and in the dump chamber 47, a dump effective area 76, as seen in FIG. 9. The effective areas in this example are those that the hammer piston 51 presents in each respective chamber that the working fluid operates on to move the hammer piston 51. The effective area is that area normal to the axis of operation or sliding of the hammer piston 51. It does not matter whether the surface forming that effective area is normal or otherwise to the axis of operation. In the example shown however the surfaces presenting in each chamber of the hammer piston 51 are also normal to the axis of operation.

In the preferred embodiment there is a net force in the ready to fire position, shown in FIG. 9, that drives the hammer piston 51 and hammer 46 fully into the driven chamber 49, which is fully to the left in FIG. 9. The hammer/hammer piston assembly comes to rest against a stop 74. In the preferred form the stop includes an energy absorber such as an o-ring as shown, or a sufficiently resilient metallic hard stop as to not deform over many movements of the hammer. The net force, and stop provides a repeatable and consistent ready to fire position each time for hammer 46. This results in a repeatable and consistent opening of the dose valve 48 when impacted by the hammer 46.

This net force in the preferred embodiment is achieved by the dump effective area 76 being greater than the driven effective area 75, as the working fluid pressures in each chamber are the same. Equally however it is envisaged there may be different pressures supplied (for example the pressure supplied to the driven chamber may be regulated to be below that of the dump chamber), with or without the effective areas being the same or different, or an additional bias supplied, such as from a spring. The advantage of using only the working fluid to operate the hammer is that residual energy can be removed (by dumping a chamber), whereas if a bias such as a spring is present there can be energy in the spring that needs to be overcome. However a bias may be useful to overcome any inherent friction.

The driven chamber 49 as shown is charged with working fluid 6 from the dose chamber 52 via port 57, seen in FIG. 9. However the driven chamber 49 may be charged directly from source 72, without any intermediate chamber, such as the dose chamber. In this shown example the dose chamber 52 is a ring shaped chamber that encircles the working chamber and the two are concentric on axis 15. Port 57 may be modified with a fixed or adjustable restricting element, baffle or other restricting geometry (e.g. reduced diameter) to restrict flow from the dose chamber 52 to the driven chamber 49.

The dump chamber 47, seen at least in FIG. 8, is charged from the source 72 this is chosen selectively by the trigger valve 50. When the trigger valve 50 is in the first valve position shown in FIG. 8 there is a fluid path from the source 72 to the dump chamber 47, via the trigger valve 50, up dump passage 56. The dose chamber 52 is also filled, in this case through port 58. Filling of the dump chamber 47 and dose chamber 52 can be sequential, whereby one fills before the other, and in the preferred form of the invention the dump chamber 47 starts to fill before the dose chamber 52. Seen in FIG. 8 this pathway is generally charged from the source of high pressure working fluid 72. The timing of filling of the dump chamber 47 and dose chamber 52 is decided by the relative locations of the spool seals 62 and spool passages 64. In the preferred embodiment, as described above, the timing is such that the dump chamber 47 fills, or at least starts to fill, before the dose chamber 52.

The pathway for charging the dose chamber 52, and dump chamber 46 is provided by the trigger valve 50, in this case as a spool valve.

Shown in FIG. 8, there is a seal formed between the internal diameter of the spool bore 65 and the external diameter of the spool valve at various points by spool seals 62. The seals are each separated by spacers 61. In the preferred form the spacers 61 allow the spool seals 62 to have a small amount of movement axially, that is, in the direction of movement of the spool 63 of the trigger valve 50. This reduces stiction of the seals, and allows the seals, for example when they are o-rings to roll partially or move and thus further reduce friction.

Which of these spool seals 62A, 62B, 62C and 62D is/are providing the seals depends on the position of the spool 63 along the bore. The spool 63 can move linearly relative to the spool bore 65 and indicated by the arrow in FIG. 8.

In the ready to fire, first valve position as shown in FIG. 8, where the dose chamber 52, dump chamber 47 and driven chamber 49 are all pressurised with working fluid 6 from the source 72, then spool seals 62A and 62D seal between the spool bore 65 inner diameter and spool 63 outer diameter. The spacers 61 have fluid communication paths, for example holes, from their outer diameter to their inner diameter. The spool spacers 61 allow working fluid to move from the spool bore inner diameter/spacer outer diameter to the spacer inner diameter/spool outer diameter. Therefore working fluid 6 can enter the spool bore 65 at its outer diameter for example from the source of high pressure working fluid 72 and travel through to, and along, the spacer inner diameter/spool outer diameter as far as spool seals allow, in this case looking at FIG. 8 seals 62A and 62D. The working fluid cannot move past these seals as they seal on the spool bore inner diameter and spool outer diameter.

To clarify, the spacers 61 that are hollow cylinders that pack between the spool seals 62. The spacers 61 have passages therethrough to allow fluid to pass to or from their outer diameter in fluid connection with the port, dump passage, or outlet to ambient, from or to their inner diameter to the spool 63 of the spool valve that forms the trigger valve 50. The spool has spool passages 64, for example as reliefs in the outer diameter of the spool 63, that allow passing of fluid under the spool seals 62 and thus to flow from one adjacent spacer 61 to the next. This allows the selective flow of fluid from the dose chamber, to the dump chamber, or to ambient, and from the dump chamber to ambient—which is further explained shortly.

Though there are another two seals 62B and 62C within the bore, in the ready to fire/charging position of FIG. 8, they each lie adjacent spool passages 64 which allow working fluid to bypass the seals 62B and 62C.

Therefore any port within confines of these two seals 62A and 62D can allow flow of working fluid. Thus the fluid 6 from the source 72 can enter port 58 and charge the dose chamber 52 (and then onto the driven chamber 49 via port passage 57) and into dump passage 56 to pressurise the dump chamber 47.

In the ready to fire/charge (first valve position) position the hammer 46 is held in place as shown in FIG. 8, by the net force acting axially on hammer piston 51, via the driven chamber 49 and dump chamber 47, and therefore the hammer 46 as earlier described In FIG. 8 the device 1 is charged and ready to fire. The dose chamber 52 is full and charged with high pressure working fluid 6 and is held closed from the working chamber 3 by the pressure of the working fluid 6 and the cage spring 54. The dose valve 48 is normally biased closed by a combination of, or exclusively by, pressure or spring force. In cases where spring force is used to close the dose valve 48 that spring force is transferred to the dose valve 48 via an encircling element called the spring cage 53. At one end the spring cage 53 captures a cage spring 54 which is in compression and biases the spring cage 53 to the right when seen in FIG. 9.

The spring cage 53 may be part of or separate to the dose valve 48.

The opposing end of the spring cage 53 engages the dose valve 48. In this case the spring cage under engages the dose valve 48 to transfer the cage spring 53 bias, to help close the dose valve 48.

The spring cage 53 extends to the left as seen in FIG. 9 of the dose valve 48 into the dose chamber 52 to allow sufficient spring length to provide the correct closing force and travel distance for the dose valve 48. This length may be tuned as needed to vary the closing force. The spring cage 53 features porting 55 to allow for uninhibited flow from the dose chamber through the dose valve opening into the working chamber.

The high pressure fluid has also travelled to both sides of the hammer piston 51 and is holding it in a force imbalance as described. In this case as the pressures are the same either side of the hammer piston 51. However, the effective areas on each side of the hammer piston 51 are different (greater on the trigger chamber side than the driven chamber side) and there is no movement of the hammer 46 as it is pressed, by the net force, against the stop 74. However, as already mentioned there may be differing pressures and therefore different areas for each chamber of the hammer, or vice versa to hold the hammer in position, as well as optional springs acting on the hammer 46 to drive the hammer, or aid in its return (not shown).

The high pressure fluid from the dose chamber has travelled to the driven chamber 49 via port passage 57. The high pressure fluid from the dose chamber has also, via the trigger valve 50 charged the dump chamber 47 via the port 58.

However, in other forms the driven chamber 49 may be supplied high pressure fluid directly from the high pressure fluid source, and not via any intermediate volume such as the dose chamber.

Figure 12:
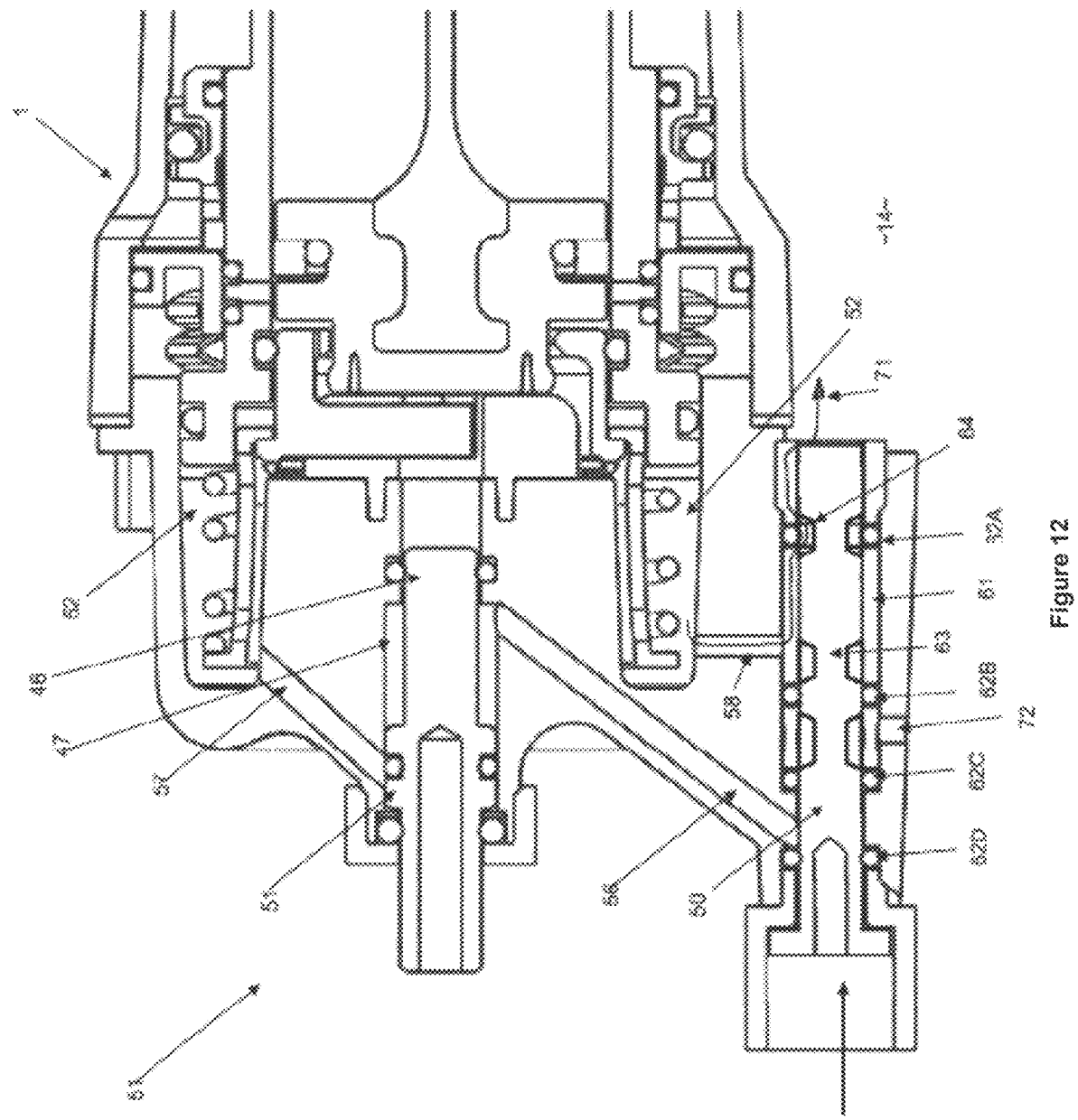
FIG. 12 shows a similar view to that of FIG. 8 but with trigger valve in the third valve position to make the device safe, such that the high pressure working fluid in the dose chamber vents to ambient, and optionally the trigger and driven chambers, and thus preventing the hammer from firing into the dose valve.

In the variation shown the trigger valve 50 is a spool valve. This has a moving spool 63 which can selectively open and close paths as described, and preferably has three positions. A first valve position, as shown for example in FIG. 8, which supplies the operative chambers directly or indirectly from the high pressure source, to a ready to work state. In this position the trigger valve, opens supply to the dose chamber, and closes any vent path therefrom, and opens supply to the dose chamber and trigger chamber to prepare for, but not to actuate the dose valve opening. The second valve position, for example as shown in FIG. 10, actuates the device and closes supply from the high pressure source. In this position the trigger valve, closes supply to the device and specifically to the dose chamber and the trigger chamber, and vents, dumps or releases the high pressure working fluid in the trigger chamber to ambient. The trigger valve also has a third valve position, as shown in FIG. 12 to make the device safe. In this position the trigger valve, blocks supply into the dose chamber, vents, releases or dumps the dose chamber to ambient, and optionally vents, releases or dumps the one or more of the remaining operative chambers.

The trigger valve 50 in the position shown in FIG. 8 as explained allows fluid only to flow from the source 72, to the dose chamber 52 and from there in the embodiment shown to the dump chamber 47. As described above the driven chamber may alternatively be supplied directly from the source 72.

The trigger valve 50 path is understood when it is considered that spool seals 62 only seal on the outer diameter of the spool 63. Therefore it can be seen that in the embodiment shown there is a first fluid path 69 from the port 58, to the left in FIG. 8, through the spool passages 64, bypassing the spool seals 62, and into the dump passage 56, and in turn up to the dump chamber 47. Importantly when the trigger valve 50 moves from the ready position to the firing position and to the make safe position there is no path for the source 72 to vent to ambient 14.

The release of pressure may be an uncontrolled dump from the operating chambers, or it may be a slow or otherwise controlled release or vent depending on the application. For example when making safe, it may be desirable to release the charge of air to ambient in a slow manner, or through a muffler or similar to reduce noise and or prevent sudden high pressure streams that may endanger a user, or disturb surroundings.

Pressure from the source 72 is also taken to charge the dose chamber and driven chamber and dump chamber, and when the dump chamber is released, via the second valve position, to fire the device the source 72 is sealed off. The charge of pressure in the dump chamber only is then dumped to ambient 14.

Likewise, when the trigger valve 50 is moved to the third valve position, which is the make safe position, the source 72 is sealed off and the charge of working fluid in the driven chamber and dose chamber is dumped to ambient 14. In the make safe position, release of the charge from the dose chamber, at least makes the device safe and prevents actuation, for example firing of the device/work (if a fastening gun) or work being done by the device. Optionally the make safe position will release the high pressure working fluid from one or more of the operative chambers, for example the dose chamber, driven chamber, and the dump/trigger chamber, thus preventing any actuation by the high pressure working fluid. When making safe optionally the driven chamber is sequentially released before the dump/trigger chamber—again in a similar way by the staging of the ports and bypass passages on the trigger valve. This will prevent the hammer from impacting the dose valve as the driven chamber will start release before the trigger chamber, thus keeping an overall net force against the hammer towards the driven chamber, away from the dose valve.

Regardless of the trigger valve position, in the preferred form there is no direct path from the high-pressure source to the working chamber. In other words there is no ability for the high pressure source to vent in an uncontrolled manner out the working chamber.

The hammer 46 is triggered by dumping the pressure in the trigger chamber 47, via dump passage 56 to a lower pressure, for example ambient or atmosphere 14. This is achieved by the trigger valve 50, moving to the firing position as seen in FIG. 10. In the example shown the spool 63 is moved to the left in FIG. 10 to allow dumping. The movement of the spool 63 provides a second fluid path 70 as shown in FIG. 9 for the fluid to dump from the dump chamber 47, via the dump passage 56, to the spool, bypassing the spool seal 62D to the left (in FIG. 9) via spool passage 64 to then exit. In the way shown in FIG. 10 there is a leak path between the spool bore 65 inner diameter and the spool piston 66 outer diameter, or in the various ways described later.

The trigger valve 50 may be actuated by a user using an actuator 73 engaged with the spool 64 of the trigger valve 50. For example actuating a trigger to actuate directly or indirectly, or by other means to drive the trigger valve 50. In this case the trigger drives the spool 63 of the trigger valve 50 to the left in FIG. 9 to dump the trigger chamber 47, via dump passage 56, and exits to ambient 14 via leak path 60. This actuation may be against a return spring (not shown) that returns the spool 63 to the charge or ready to fire position, whether acting on the spool directly, or indirectly, for example by the trigger.

Two further variants of the trigger valve 50 exit to ambient 14 are shown in FIGS. 11A and 11B. In FIG. 11A there is a further sealing element of the spool 63, shown for example as a spool seal 62E on the spool piston 66 sealing on and moving relative to the spool bore 65 inner diameter in FIG. 12B, or alternatively the sealing element 62 may be mounted in a groove on the spool bore 65 and seals and moves relative to and against an elongated, or not, spool piston 66. Instead of a restriction or leak path in the earlier variation in FIG. 8, this allows the ability to increase the pressure bias on the spool 63, via the pressure on the spool piston 66, acting leftward, to open it more quickly, assisting with pressure dump performance. This may be used to force the spool valve 50 to move quickly to the fully open position to dump the working fluid from the dump chamber. Thus if the trigger valve 50 is partially activated then this feature will ensure it moves all the way to activated, ie dumping the dump chamber.

A further variation on the exit path for the high pressure fluid on dumping from the dump chamber is shown in FIG. 11B. This may be instead of, or in addition to that of FIG. 11A. This variation allows either a release or bypass flow path 67 to open when the spool 63 has moved a sufficient distance to the left. Two variations of this are shown, a flow path 67A that exits the side of the spool bore 65, or one that uses a spool passage to by pass the spool piston 66 as the flow path 67B.

This allows a slow release if initially there is a leak path, and then sudden release while still protecting the spool piston 66 at the extremes of movement. In addition when coupled with a seal such as that of FIG. 11A it allows pressure to aid in moving the spool 63 and then quick pressure release.

Once the trigger chamber 47 is evacuated the "firing" sequence has begun. Dumping the trigger chamber 47 creates a pressure differential between the driven chamber 49 (higher) and the trigger chamber 47 (dumped to low pressure, e.g. ambient 14).

The higher pressure in the driven chamber 49 then drives the hammer 46 to impact the dose valve 48 which then momentarily opens the dose valve 48 to allow a charge of working fluid 6 from dose chamber 52, to enter into the working chamber 4 to in turn drive the workload 4. This has beneficial impacts on the available performance of the tool, both in terms of efficiency and packaging.

The arrangement of the invention also prevents the dose chamber 52 from evacuating through the port passage 57, as there is no path to ambient 14 from there under normal triggering use. Likewise, except for that variation shown in FIG. 11C, there is no leak path to ambient of the dose chamber 52 from the port 58, under normal triggering. This is because the spool 63 of the trigger valve 50 never fluidly connects the dose chamber 52 to ambient 14. The dump chamber 47, and dump passage 56 only dump to ambient 14, when the spool 63 moves from ready to fire, to firing. The source 72 is sealed off from ambient so there is no continuous flow out path of high pressure working fluid from the source. In this way the present invention makes more efficient use of the charge of working fluid in the dose chamber 52.

The hammer 46 may then be returned to a ready to fire or first position by re-establishing the rearward force bias or imbalance on the hammer resultant between the trigger chamber pressures and pressure areas 47 and the driven chamber 49, in addition to any elastic force bias members that act on the hammer.

In addition the hammer 46 may also, at least in part, be driven by a spring (not shown) toward the dose valve 48, or a spring (not shown) to help it return away from striking the dose valve 48. There may also be an elastic energy exchange between the hammer 46 and the dose valve 48, such that that hammer 46 bounces back. For example the dose valve closing (moving to the left in FIG. 9) may impart sufficient energy into the hammer to drive it back at least part way, a pressure difference in favour of the dump chamber may move it the remainder of the way.

A further option is shown in FIG. 11C, where there is a transfer port 68 between the dose chamber 52 and the dump passage 56, and hence to the dump chamber 47. Typically this is a restricted size port 68 to allow pressure flow, but to restrict its volume or speed. This changes the order of operations slightly and pressure balances significantly. The effect is to equalise the pressures on the hammer 46 more quickly after the hammer 46 strike, allowing faster hammer reset and possibly faster dose valve 48 closure leading to a more efficient drive stroke. This option has a significant trade-off in that there is now a leak path from dose chamber to atmosphere via the trigger spool 63 if the trigger is held in the firing position (that is all the way to the left). In this situation the trigger may be a momentary one that then allows the spool 63 to return to closed as soon as possible. The flow capacity out of the trigger valve 50 upon dump must be significantly larger than the restricted flow transfer port 68 from the dose chamber to the dump chamber. This means that any pressure signal from the dose chamber to the dump chamber will be lost to ambient, and thus is a less preferred variant.

When the trigger valve 50 is allowed to move back to the right, such as back to the position in FIG. 8, the dump chamber 47 is re-pressurised to help move the hammer 46 back to the ready to strike position and the trigger system is now reset.

High pressure pneumatic tools frequently require a method to 'make safe'. The trigger valve 50 of the present invention incorporates both the 'make safe' energy release function as described below, and the triggering 'firing' function, as described above into a single movable body or valve assembly, movable in one direction to achieve triggering and the opposite direction to achieve making safe.

The trigger valve 50 has a third position to make the device 1 safe as shown in FIG. 12. There is a path to ambient 14 when the trigger valve 50 is placed into the make safe position, described below, however this is not part of the normal triggering operation that fires the device, but rather is part of the making the device safe, though it is operated by the trigger valve.

Again the path for the working fluid 6 out in the make safe position is dependent on the trigger valve and the interactions of the spool seals 62, spool passages 64, and spacers 61. Specifically, as shown in FIG. 12 spool seals 62D, 62C and 62B all seal on the inner diameter of the spool bore 65 and outer diameter of the spool 63. Therefore any working fluid trapped between them cannot escape. This means the source of high pressure fluid 72 is sealed as it lies between seals 62B and 62C, as is the dump passage 56 as it lies between the seal 62C and 62D. However, port 58, is free to vent, using spacer 61, using spool passage 64 to bypass spool seal 62A. From there the dumped fluid 71 can pass to low pressure or ambient 14. In this way the working fluid 6 in the driven chamber 49, and dose chamber 52 can be removed from the device. This prevents the device from being actuated, or fired and therefore the device is made safe.

The trigger valve 50 is a three position pneumatic trigger—pushing to the right (as seen in FIG. 12) dumps the working fluid 6 from the dose chamber 52 via port 58 to a lower pressure safe location, for example ambient 14 as shown, to make the device safe, for example when used in a fastening tool such as a nail gun. In this way the "charge" of working fluid, as highly compressed air, is removed from the dose chamber 52 such that even if the dose valve 48 is opened there is no charge to drive the work load 4, and thus the device incorporating the present invention is safe.

However, actuating or pulling the trigger valve 50 to the left (as seen in FIG. 10), will dump the working fluid from the dump chamber 47 to then fire the device 1. The trigger valve 50 may have a leak path 60 to the left, acting on the trigger valve 50 as shown to increase the speed of action of the trigger valve opening.

For the exhaust valve 2 in FIG. 4 there is shown a baffle 26, and baffle port 27 in the return chamber 10. These are used to tune the rate at which the pressure builds up against the working face 28 of the exhaust valve 2. Under dynamic loading the pressure on the second end 8 side of the baffle will build much faster than on the first end 5 side of the baffle due to the reduction to the that of the size of the baffle port 27. The smaller the baffle port 27 the slower the pressure build of the return fluid 42 against the working face 28.

The working face 28 of the exhaust valve 2 in this embodiment is in part formed by a valve member 37, in this case an o-ring 34. However valve member 37 may be any other suitable sealing arrangement that can seal and unseal for example, but not limited to an x-ring, lip seal, or other continuous or variable cross section sealing element. When the pressure difference is higher in the return chamber 10, due to return fluid being pushed therein by travel of the workload down the working chamber toward the second end 8, it acts on the valve member 37, in this case an o-ring 34 to move it to seal off the inter-chamber port 40 as seen in FIG. 8. In doing so the pressure difference between the return chamber 10 and that present in the exhaust chamber 21 to the exit 30 will cause the exhaust valve 2 to translate and move to, or toward an open position 12 (that is to the left in the Figures as drawn). In opening the exhaust valve 2 forms the exhaust chamber 21 as described above, between the body of the exhaust valve 2 and the surrounding housing 36.

The size of the working face 28 and the opposing interior face within exhaust chamber 21 of the exhaust valve 2 are tuned such that the exhaust valve 2 will stay open due to the difference in pressure in the exhaust chamber 21 and the return chamber 10. The tuning may be achieved by the seals used front and back, and on the inner and outer diameter of the exhaust valve to create different sized areas for the pressures to work on thus creating differing sizes forces to operate the exhaust valve 2.

The exhaust valve 2 again is normally biased closed by a bias 29, in this case a spring. The bias is selected based on the pressures experienced in the return chamber 10, and those experienced in the exhaust chamber 21, such that the exhaust valve 2 opens, remains open, and then closes as needed for the timing of the device.

The exhaust valve 2 as shown is sealed on its outer and inner circumferences by seals 38, in this case as shown o-rings, but these may be any suitable sealing member and material.

A supply of highly pressurised working fluid 6 is briefly supplied to the rear surface 9 of the workload 4 from the first end 5, for example by a dose valve 48 opening. This sends the workload 4 down toward the second end 8 of the working chamber, as indicated by the arrow in FIG. 4.

The exhaust valve 2 in this variation again is ring shaped, and has at least one, and preferably several apertures through from its inner periphery to its outer periphery to form the exhaust valve ports 33.

The exhaust valve 2 also has an exhaust valve chamber face 39 as seen in FIG. 9. Normally when the pressure difference on the working face 28 is not sufficient to overcome the bias 29 then the exhaust valve would close. However, the pressure difference and fluid flow into the exhaust chamber 21, and out, restricted by the leak path, acting on the exhaust chamber 21 and exhaust valve chamber face 39, will hold the exhaust valve 2 in the open position 12. Thus any pressure difference on the rear surface 9 of the workload 4 will continue to be allowed to evacuate as the workload 4 moves to the ready position at or toward the first end 5.

With the continued movement of the workload 4 up the working chamber 3 toward the first end 5 there is an ability for the return chamber 10 pressure to fall below that of the pressure on the rear surface 9 of the workload 4. This is most likely evident toward the end of the stroke of the workload 4 toward the first end 5, potentially as the exhaust valve 2 moves towards a closed 11 condition. In this situation there will be a pressure difference between the exhaust 33, for example atmosphere 14, and the return chamber 10. In this situation the valve member 37 will open to allow fluid to transfer into the return chamber 10 via the inter-chamber port 40 as shown by the arrow in FIG. 11. This will thus further aid return of the workload 4 to the ready position.

To provide lower friction levels the valve member 37, for example when an o-ring 34 or other suitable shape, seals only when moved by the flow of the fluid pushing it into position and compressing it so that it closes off a pathway, statically with no pressure difference or flow the valve member 37 is not sealing and thus provides little or no friction.

The method of operation will now be explained further.

The embodiment in FIGS. 1 through 3, actuated by the trigger valve of FIGS. 4 through 12, operate in the same way, including the exhaust valve, with the addition of recirculation using the chamber port 35 and check valve 23 as a reed valve 24 in FIGS. 3A through D. FIGS. 4 through 11, operate on the same principles with the recirculation provided within the exhaust valve itself. The direction of movement in each Figure is shown an arrow on the workload 4.

On triggering by an external mechanism, the spool 63 moves to the left to dump pressure from the dump chamber 47, and drive the hammer 46 into the dose valve 48. The dose valve cracks open and unseals the dose chamber 52 from the working chamber 3. A charge of high pressure working fluid 6, for example but not limited to a gas such as air, is then supplied to the rear surface 9 of the workload 4 in the working chamber 3, as shown in FIGS. 1 through 12. The supplied portion of working fluid 6 expands into the rapidly forming volume formed by the working cylinder 3 and workload 4 as the workload is forced, by the working fluid 6, down toward the second end 8.

As soon as the required charge of working fluid is supplied by the dose valve 48 from the dose chamber 52 into the working chamber 3, the dose valve 48 closes again sealing the dose chamber 52 from the working chamber 3. The spool 63 has also returned to the position in FIG. 8, and the dump chamber 47 is again energised by high pressure fluid from the dose chamber 52 and source 72, to aid in bringing the hammer 46 back into the ready to fire, force balance position. The dose chamber 52 is also supplied with high pressure fluid, if needed, from the supply of high pressure fluid 72, for example a high pressure tank or similar, and may be regulated from the tank pressure to the operating pressure of the device.

As the workload 4 moves down the working chamber 3 air or similar fluid, on front of the front surface 7 is forced down the working chamber. As a result this fluid, termed for convenience here as return fluid 42, enters the return chamber 10 through either of the first or second fluid connections 17 or 18.

When the workload 4 is captive, as shown in the examples, then the volume defined by the front surface 7 and the working chamber 3 is a closed one. However, if the workload is to be ejected, then the principles will still apply as there will be a pressure wave of fluid in front of the piston as it moves down the working chamber 3. In which case the fluid connection 17 and or 18 are of a different shape, to capture at least in part, some of this return fluid 42.

As the return fluid enters the return chamber it acts on the working face 28 of the exhaust valve 2. The exhaust valve 2 normally biased closed 11 by bias 29, is then forced open once the bias force is overcome by the pressure of the return fluid 42 acting on the working face 28. This is the same for the variations shown in FIGS. 1 through 12.

The exhaust valve 2 then moves to, or toward the open state 12. The build-up of pressurised fluid in the blind volume of the return chamber 10 then returns to the working chamber 3 and acts to push the workload 4 back up the working chamber and return it from the second end 8, to the first end 5.

The workload 4 can now start to move freely back up the working chamber 3 toward the first end 5. Where otherwise the volume defined by the working chamber 3, rear surface 9, and first end 5 would cause a pressure build up, resisting movement of the workload 4, as it moves to the first end 5, the exhaust valve is now open 12, and there is a path for that pressure to exhaust through to a lower pressure, for example atmosphere 14. However, any low pressure may well be suitable.

The exhaust valve 2 as described earlier provides a flow path to a low pressure, as shown in FIGS. 2, 5, 6, 9, and 10 as exhausting fluid 41. To be clear the fluid exhausted is not combustion gas, but rather is just the working fluid 6 that has expanded from its high pressure, into the working chamber 3 volume and done work on the workload 4.

In FIGS. 1 and 2 this open exhaust pathway for exhaust fluid 41 may be sufficient for the workload 4 to return to the ready position at the first end 5.

However, in some situations, a low pressure may occur in the return chamber 10, preventing full return of the workload 4 to the first end 5.

In this case the variations of FIGS. 3A-D, and 4 through 11 can be used that allow recirculation.

In FIGS. 3A-D, if a low pressure occurs in the volume of the return chamber 10, and that defined by the working chamber 3, second end 8 and front face 7, then there is the chamber port 35 with its check valve 23, shown as a reed valve 24. The check valve will open at the designed pressure difference between external of the return chamber 10, for example low pressure area, such as atmospheric 14, and allow recirculation to reduce the pressure differential to the rear surface 9, thus allowing movement of the workload consistently and fully to the first end 5.

The variation in FIGS. 4 through 11 operates on a similar principle where the valve to allow re-circulation into the return chamber 10 is incorporated into the exhaust valve 2, with an extended ability to hold the exhaust valve 2 open.

The variation of FIGS. 4-11 again has the exhaust valve 2 opened 12 by the return fluid pressure 42 in the return chamber 10 acting on the working face 28 of the exhaust valve 2. The working face 28 is in part defined by the mobile valve member 37, which in this case is an o-ring 34 that can move to seal the working face 28, and unseal it (described below). When sealing the working face 28, the o-ring 34 also then provides pressure on the exhaust valve 2 to move it to, or aid in helping it stay in, an open position 12.

As the exhaust valve 2 moves to the open position 12 it defines between its exhaust valve chamber face 39 and the interior of the housing an exhaust chamber 21. When open 12, the working fluid can pass through the exits 30, through the exhaust valve port 33 into the exhaust chamber 21, and then via a restriction or leak path, to the exhaust 32. The restriction, or leak path out of the exhaust chamber 21 is of lower flow rate than the flow rate into the exhaust chamber 21, thus creating a pressure that aids in helping keep the exhaust valve 2 open 12.

The flow path from the side wall exits 30 to the exhaust chamber 21, and then from the exhaust chamber 21 to the exhaust 32 may be throttled, for example by the leak path, or another restriction, to have a differing flow capacity into the exhaust chamber, then from the exhaust chamber. This baffling or restriction allows pressure to build up in the exhaust chamber 21 and also slows its release to aid tuning of how long the exhaust valve 2 stays open.

The workload 4 is then able, under action of the return fluid 42, as earlier described, to move back up the working chamber 3 to the first end 5.

To increase the open time of the exhaust valve 2, and allow further tuning options for opening and closing, the pressure built up in the exhaust chamber 21, and more specifically acting on the exhaust valve chamber face 39 and its opposing faces continues to hold the exhaust valve open, even after the pressure in the return chamber has reduced such that the exhaust valve 2 would otherwise close 11. This increases the exhaust valve open time and thus increases the ability for the work load 4 to consistently return to the first end.

Figure 7:
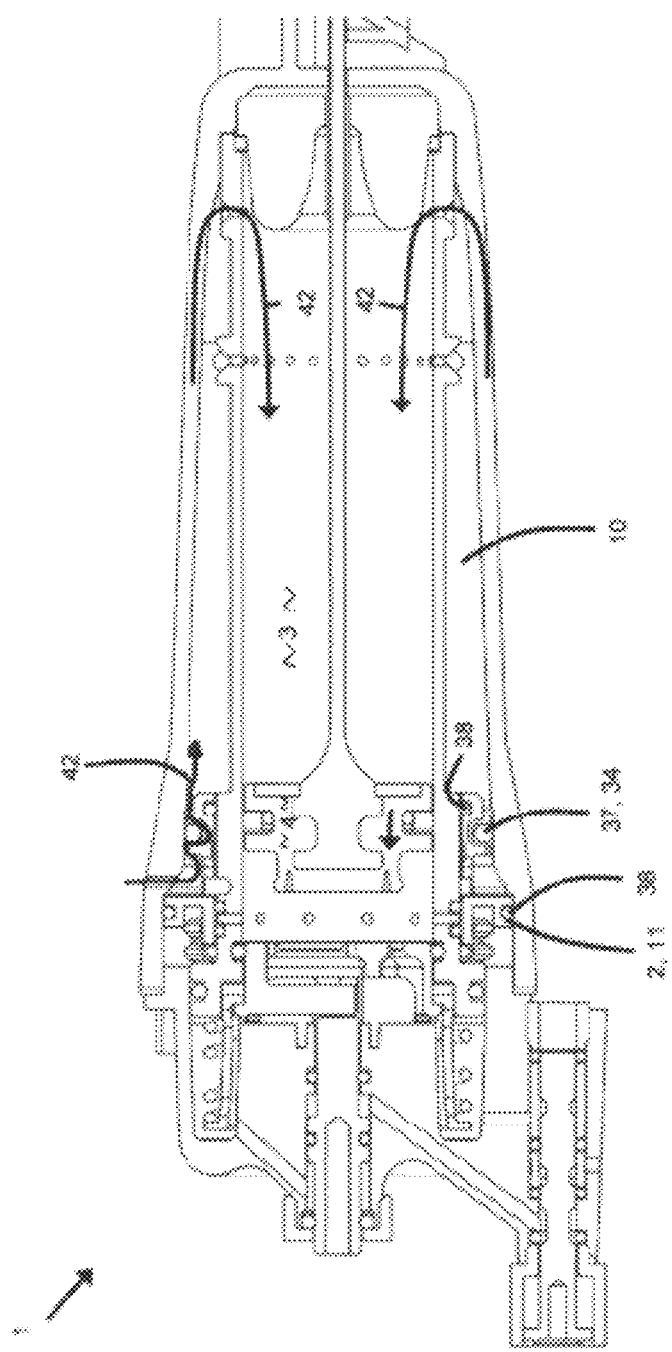
FIG. 7 shows a similar view to that of FIG. 6, but where the one way check valve in the exhaust valve has opened to allow recirculation into the return chamber.
Figure 11:
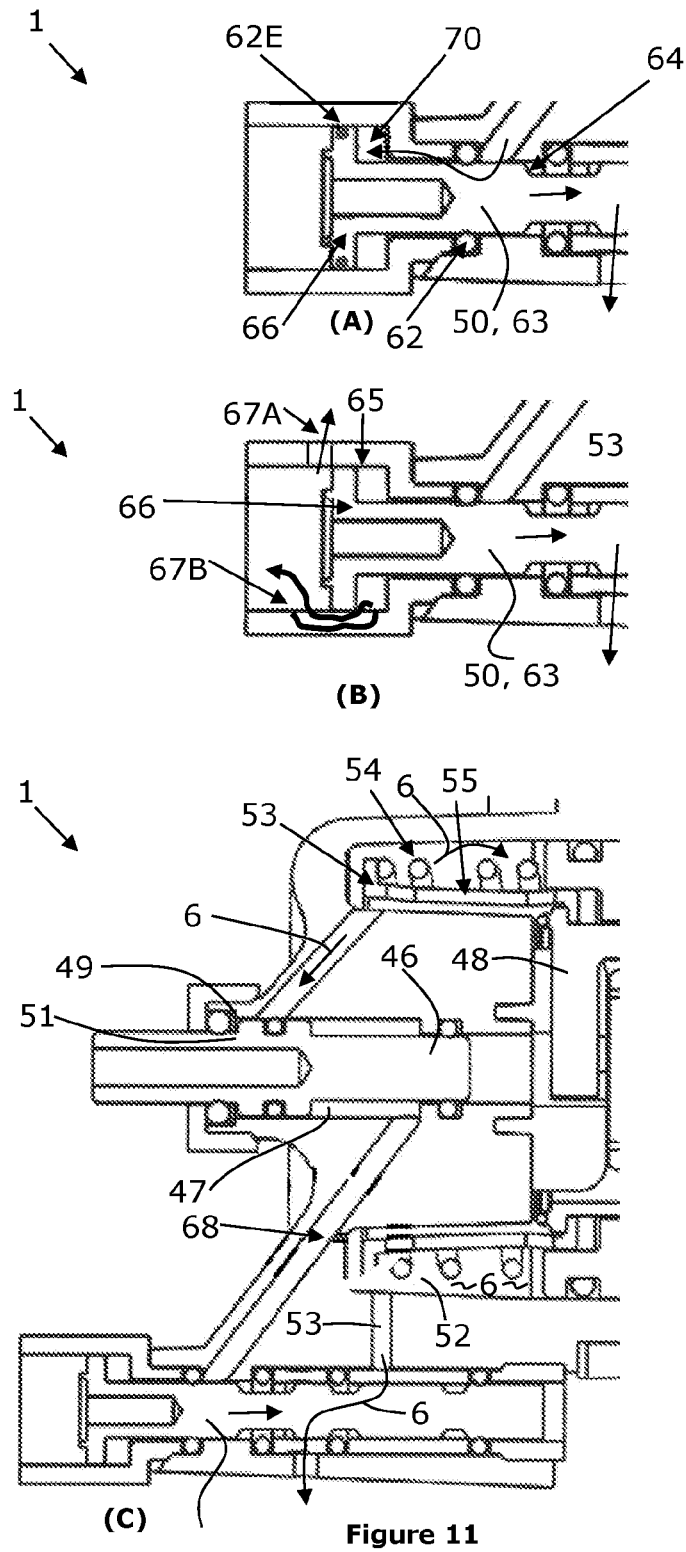
FIG. 11 shows close ups cross-sectional views of further variations of trigger valving arrangements to control dumping of the dump chamber at (A) a sealing element on the trigger valve piston, (B) a vent from the spool bore for the trigger valve piston, and (C) feeding the dump chamber through a transfer port from the dose chamber.

In addition the exhaust valve has an inter-chamber port 40 between the exhaust chamber 21 and the return chamber 10, and preferably between the exhaust 32 and the return chamber 10. This inter-chamber port 40 is, in the preferred embodiment valved by the valve member 37. Thus when there is a pressure difference between the exhaust chamber 21 or exhaust 32 and the return chamber 10 the valve member 37 will open and allow recirculation into the return chamber, to act effectively as a return fluid 42 as shown in FIGS. 7 and 11. Thus even if the exhaust valve 2 has closed, this will further allow the workload 4 to consistently return to the first end 5 and again be ready to work.

Moving the exhaust valve 2 to or towards the first end provides ease of assembly and reduced part count. Further having the exhaust as a side exhaust provides reduced complexity when compared to an axial port that must go through parallel to the longitudinal axis 15 at the first end. The result is also a more compact structure with less parts, lower cost to manufacture, and ease of assembly and maintenance.

In the present invention the introduction of the hammer in conjunction with the inflow shutoff function (from the high pressure source) of the trigger system allows for extremely short duration pulsed flow to be achieved into the working chamber. This allows for extremely high thermodynamic efficiency and cycle rate.

The short duration pulse of high pressure working fluid means that the volume of working fluid entering the work chamber is low, but is then allowed to expand by a large multiple which is strongly linked to the thermodynamic efficiency of compressed fluid-mechanical systems.

In the present invention making the required pneumatic trigger componentry perform both the triggering and 'make safe' functionality, all performance metrics mentioned earlier can be maintained while meeting regulation and good safety design requirements.

The foregoing description of the invention includes preferred forms thereof. Modifications may be made thereto without departing from the scope of the invention.

The invention claimed is:

1. An actuation trigger for a device, comprising:
   a dose chamber to hold a charge of high pressure working fluid, received from a high pressure source;
   a dose valve biased closed to seal the dose chamber off from a working chamber and hold the charge in the dose chamber;
   a hammer operated by a piston with a driven chamber on a first side of the piston, and a trigger chamber on a second side of the piston, sealed from the first side, the driven chamber receiving the high pressure working fluid directly or indirectly from the high pressure source; and
   a trigger valve to selectively supply the high pressure working fluid to the trigger chamber, or to release the high pressure working fluid from the trigger chamber, wherein, when the hammer has the high pressure working fluid in both the driven chamber and the trigger chamber, the hammer is held by a force imbalance in a first position, and when the high pressure working fluid is released from the trigger chamber, the hammer is driven to or towards a second position towards the trigger chamber; and
   wherein the hammer, when driven to or towards the second position, strikes the dose valve, unseating the dose valve to unseal the dose chamber and the working chamber thus allowing the charge to enter the working chamber to do work therein.

2. The actuation trigger of claim 1, wherein the force imbalance results from a greater working area for the high pressure working fluid on a trigger chamber side of the piston than a working area for the high pressure working fluid on a driven chamber side of the piston.

3. The actuation trigger of claim 1 wherein, when the dose valve is open from the dose chamber to the working chamber, there is no supply from the high pressure source to the dose chamber via the trigger valve.

4. The actuation trigger of claim 1 wherein the trigger valve acts to selectively release high pressure working fluid to ambient from, or supply directly or indirectly high pressure working fluid from the high pressure source to any of the dose chamber, driven chamber or trigger chambers in order to trigger the device, which trigger valve has at least two positions:
   a. a first valve position to supply the operative chambers directly or indirectly from the high pressure source, to a ready to work state, wherein the trigger valve:
      i. opens supply to the dose chamber, and closes any vent path therefrom, and
      ii. opens supply to the dose chamber and trigger chamber to prepare for, but not to actuate a dose valve opening; and
   b. a second valve position to actuate the device and close supply from the high pressure source, wherein the trigger valve:
      i. closes supply to the device and specifically to the dose chamber and the trigger chamber, and
      ii. vents the trigger chamber to ambient.

5. The actuation trigger of claim 1, wherein the trigger valve has a third valve position to make the device safe, wherein the trigger valve:
   a. blocks supply into the dose chamber;
   b. vents the dose chamber to ambient; and
   c. optionally vents one or more of the driven chamber or trigger chamber.

6. The actuation trigger of claim 1 wherein when the trigger valve closes supply to the device, the high pressure working fluid is prevented from leaving the high pressure source.

7. The actuation trigger of claim 1, wherein the trigger chamber, when supplied, fills ahead of the dose chamber.

8. The actuation trigger of claim 1, wherein the hammer slides along a first sliding axis and the dose valve slides along a second sliding axis.

9. The actuation trigger of claim 8, wherein the first sliding axis and second sliding axis are parallel.

10. The actuation trigger of claim 9, wherein the first sliding axis and second sliding axis are concentric.

11. The actuation trigger of claim 1, wherein the dose valve is an annular ring that has an annular ring sealing surface to seal off the dose chamber from the working chamber and wherein the dose valve is biased closed by a spring.

12. The actuation trigger of claim 1, wherein the hammer:
has an elastic element on the first or second side to aid or retard the force imbalance; and
is returned to, or toward the first position, at least in part by the dose valve or a return of high pressure working fluid to the trigger chamber.

13. The actuation trigger of claim 1, wherein a work load is:
captive within the working chamber or not captive and is expelled from the working chamber or a pressure wave within the working chamber to otherwise perform work.

14. The actuation trigger of claim 1, wherein the high pressure working fluid:
is a compressible or incompressible fluid; or
is in a range of 15 bar to 100 bar; or
is a gas.

15. The actuation trigger of claim 1, wherein the high pressure working fluid is a gas.

16. The actuation trigger of claim 1 including an exhaust valve wherein:
a work load to do the work on, within, or from the working chamber is driven from a first end of the working chamber to or towards an opposing, second end of the working chamber using the high pressure working fluid on a rear surface of the workload;
a fluid pressure is received into a return chamber from a front surface or region of the work load, the fluid pressure formed at least in part as a result of the work load moving down the working chamber towards the second end of the working chamber; and
wherein the exhaust valve is adapted to open as a result of the fluid pressure in the return chamber acting on a working face of the exhaust valve, and wherein the exhaust valve, when opened, allows high pressure working fluid in the working chamber present on the rear surface to exhaust from the working chamber to a lower or ambient pressure location, the high pressure working fluid exiting via a side wall of the working chamber through to the exhaust valve, thus producing a pressure difference from the front surface to the rear surface to thus return the work load from the second end of the working chamber to, or toward, the first end of the working chamber, and wherein the exhaust valve exhausts the high pressure working fluid at an angle that is not parallel to a longitudinal axis running between the first end of the working chamber and the second end of the working chamber, rather than substantially parallel to the longitudinal axis, and wherein the exhaust from the working chamber is at or near to a right angle relative to the longitudinal axis.

17. An actuation trigger for a device, comprising:
a dose chamber to hold a charge of high pressure working fluid received from a high pressure source;
a dose valve biased closed to seal the dose chamber off from a working chamber and hold the charge in the dose chamber openable under controlled action to allow the charge into the working chamber; and
a trigger valve to selectively supply the high pressure working fluid from the high pressure source to the dose chamber and to control opening and closing of the dose valve, whether directly or indirectly,
wherein, when the dose valve is open from the dose chamber to the working chamber, there is no supply from the high pressure source to the dose chamber via the trigger valve.

18. A device, comprising:
a dose chamber to hold a charge of high-pressure working fluid received from a high-pressure source;
a dose valve biased closed to seal the dose chamber off from a working chamber and hold the charge in the dose chamber;
a hammer operated by a piston with a driven chamber on a first side of the piston and a trigger chamber on a second side of the piston sealed from the first side, the driven chamber receiving the high pressure working fluid directly or indirectly from the high pressure source; and
a trigger valve to selectively supply the high pressure working fluid to the trigger chamber, or to release the high pressure working fluid from the trigger chamber, such that, when the hammer has high pressure working fluid in both the driven chamber and the trigger chamber, the hammer is held by a force imbalance in a first position and, when the high pressure working fluid is released from the trigger chamber, the hammer is driven to or towards a second position towards the trigger chamber,
wherein the hammer, when driven to or towards the second position, strikes the dose valve, unseating the dose valve to unseal the dose chamber and the working chamber thus allowing the charge to enter the working chamber to do work therein.

19. A method of actuating a device, comprising:
charging a dose chamber with a charge of high pressure working fluid;
charging a driven chamber on a first side of a hammer with the high pressure working fluid;
charging a trigger chamber on a second side of the hammer with the high pressure working fluid, the first side and second side separated by a piston operatively connected to the hammer such that the hammer is held in a force imbalance in a first position;
releasing the high pressure working fluid from the trigger chamber to drive the hammer to or towards a second position; and
actuating a dose valve by the hammer impacting thereon when in or towards the second position to unseat the dose valve from a sealing position, wherein the dose valve seals the dose chamber from a working chamber to an unsealed position such that the charge enters the working chamber to do work therein.

* * * * *